(12) United States Patent
Lv et al.

(10) Patent No.: US 9,871,929 B2
(45) Date of Patent: Jan. 16, 2018

(54) COMMUNICATION METHOD AND USER EQUIPMENT

(71) Applicant: HUAWEI DEVICE (DONGGUAN) CO., LTD., Dongguan (CN)

(72) Inventors: Xiaoqiang Lv, Beijing (CN); Wenmei Gao, Beijing (CN); Shunan Fan, Beijing (CN); Yahui Wang, Beijing (CN); Hao Jing, Beijing (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 170 days.

(21) Appl. No.: 14/553,511

(22) Filed: Nov. 25, 2014

(65) Prior Publication Data
US 2015/0156326 A1 Jun. 4, 2015

(30) Foreign Application Priority Data
Nov. 29, 2013 (CN) .......................... 2013 1 0628995

(51) Int. Cl.
*H04W 72/08* (2009.01)
*H04M 7/00* (2006.01)
(Continued)

(52) U.S. Cl.
CPC ...... *H04M 7/0024* (2013.01); *H04L 65/1059* (2013.01); *H04L 65/1069* (2013.01);
(Continued)

(58) Field of Classification Search
CPC ....... H04M 7/00; H04M 7/0024; H04L 29/06; H04L 65/1059; H04L 29/08;
(Continued)

(56) References Cited

U.S. PATENT DOCUMENTS

| 9,467,480 B2* | 10/2016 | Mandyam ........... H04L 65/1003 |
| 2014/0126715 A1* | 5/2014 | Lum .................... H04M 3/5133 |
| | | 379/265.09 |

(Continued)

FOREIGN PATENT DOCUMENTS

| CN | 103404132 A | 11/2013 |
| CN | 103414835 A | 11/2013 |

OTHER PUBLICATIONS

Roach, A. B., et al., "Using Partial Offers and Partial Answers in a Multimedia Session," draft-roach-mmusic-pof-pan-01, Oct. 17, 2013, 32 pages.
(Continued)

*Primary Examiner* — Edan Orgad
*Assistant Examiner* — Vanneilian Lalchinthang
(74) *Attorney, Agent, or Firm* — Conley Rose, P.C.

(57) ABSTRACT

Embodiments of the present invention provide a communication method and a user equipment. The method includes: establishing, by a first user equipment, Internet-based Web Real-Time Communication WebRTC multimedia communication with a second user equipment, where the Internet-based WebRTC multimedia communication includes Internet-based WebRTC audio communication and Internet-based WebRTC non-audio communication; and performing, by the first user equipment, a first audio communication change operation, where the performing, by the first user equipment, a first audio communication change operation includes: establishing, by the first user equipment, telecommunications domain-based audio communication with the second user equipment, and disconnecting, by the first user equipment in a case in which the Internet-based WebRTC non-audio communication with the second user equipment remains, the Internet-based WebRTC audio communication with the second user equipment. According to the embodi-
(Continued)

ments of the present invention, quality of communication between user equipments can be improved.

20 Claims, 4 Drawing Sheets

(51) Int. Cl.
*H04L 29/06* (2006.01)
*H04L 29/08* (2006.01)

(52) U.S. Cl.
CPC .......... *H04L 65/1083* (2013.01); *H04L 65/80* (2013.01); *H04L 67/02* (2013.01)

(58) Field of Classification Search
CPC ..... H04L 65/1069; H04L 67/02; H04L 65/80; H04L 65/1083; H04W 4/00
USPC ........................................................ 370/352
See application file for complete search history.

(56) References Cited

U.S. PATENT DOCUMENTS

| | | | |
|---|---|---|---|
| 2014/0222894 A1* | 8/2014 | Gangadharan | H04L 67/02 709/203 |
| 2014/0222957 A1* | 8/2014 | Gangadharan | H04L 67/141 709/217 |
| 2014/0344169 A1* | 11/2014 | Phelps | G06Q 30/016 705/304 |
| 2015/0002619 A1* | 1/2015 | Johnston | H04N 7/147 348/14.12 |
| 2015/0006610 A1* | 1/2015 | Johnston | H04L 65/103 709/202 |
| 2015/0019746 A1* | 1/2015 | Shatzkamer | H04L 65/1069 709/228 |
| 2015/0039760 A1* | 2/2015 | Yoakum | H04L 65/1059 709/225 |
| 2015/0106528 A1* | 4/2015 | Somes | H04L 67/141 709/228 |
| 2015/0121250 A1* | 4/2015 | Waxman | G06F 3/04817 715/753 |
| 2015/0350723 A1 | 12/2015 | He | |

OTHER PUBLICATIONS

Perkins, C., et al., "Web Real-Time Communication (WebRTC) : Media Transport and Use of RTP," draft-ietf-rtcweb-rtp-usage-10, Oct. 21, 2013, 42 pages.
Choong, K. N., et al., "SIP-based IEEE802.21 media independent handover—a BT Intel collaboration," BT Technology Journal, vol. 25, No. 2, Apr. 2007, pp. 219-230.
Sandgren, N., "WebRTC Interworking with Traditional Telephony Services," Ericsson Research Blog, Retrieved from URL:http://www.ericsson.com/research-blog/context-aware-communication/webrtc-interworking-traditional-telephony-services/ on Mar. 16, 2015, 6 pages.
Foreign Communication From a Counterpart Application, European Application No. 14194362.1, Extended European Search Report dated Mar. 25, 2015, 9 pages.
Machine Translation and Abstract of Chinese Publication No. CN103414835, Nov. 27, 2013, 4 pages.
Foreign Communication From A Counterpart Application, Chinese Application No. 201310628995.1, Chinese Search Report dated Sep. 5, 2017, 3 pages.
Foreign Communication From A Counterpart Application, Chinese Application No. 201310628995.1, Chinese Office Action dated Sep. 13, 2017, 8 pages.

\* cited by examiner

100

| A first user equipment establishes Internet-based WebRTC multimedia communication with a second user equipment, where the Internet-based WebRTC multimedia communication includes Internet-based WebRTC audio communication and Internet-based WebRTC non-audio communication | S110 |

| The first user equipment performs a first audio communication change operation, where that the first user equipment performs the first audio communication change operation includes: the first user equipment establishes telecommunications domain–based audio communication with the second user equipment, and the first user equipment disconnects, in a case in which the Internet-based WebRTC non-audio communication with the second user equipment remains, the Internet-based WebRTC audio communication with the second user equipment | S120 |

FIG. 1

COMMUNICATION METHOD AND USER EQUIPMENT

CROSS-REFERENCE TO RELATED APPLICATION

This application claims priority to Chinese Patent Application No. 201310628995.1, filed on Nov. 29, 2013, which is hereby incorporated by reference in its entirety.

TECHNICAL FIELD

The present invention relates to the communications field, and in particular, to a communications method and a user equipment.

BACKGROUND

Web Real-Time Communication (WebRTC) is a technology that can support a web browser to perform real-time multimedia communication. Different from a conventional multimedia communication manner based on a local client or a browser plug-in, the WebRTC integrates core modules that are necessary for multimedia communication, such as a processing (collecting, encoding, and enhancing) module, a network transmission module, and a session control module into a browser, so that a third-party application developer can obtain a real-time multimedia communication capability by simple JavaScript application programming interface (API) invoking only.

However, the WebRTC is after all multimedia communication based on the Internet and has inherent deficiencies. That is, service quality depends on a network condition of the Internet, and when the network condition is poor, the service quality of the WebRTC is greatly reduced, so that an advantage of free of charge or a low charge rate of the WebRTC cannot be reflected.

SUMMARY

Embodiments of the present invention provide a communication method and a user equipment, which can improve quality of communication between user equipments.

According to a first aspect, a communication method is provided, and includes: establishing, by a first user equipment, Internet-based Web Real-Time Communication WebRTC multimedia communication with a second user equipment, where the Internet-based WebRTC multimedia communication includes Internet-based WebRTC audio communication and Internet-based WebRTC non-audio communication; and performing, by the first user equipment, a first audio communication change operation, where the performing, by the first user equipment, a first audio communication change operation includes: establishing, by the first user equipment, telecommunications domain-based audio communication with the second user equipment, and disconnecting, by the first user equipment in a case in which the Internet-based WebRTC non-audio communication with the second user equipment remains, the Internet-based WebRTC audio communication with the second user equipment.

With reference to the first aspect, in a first possible implementation manner of the first aspect, before the performing, by the first user equipment, a first audio communication change operation, the method further includes: determining, by the first user equipment, that the audio communication with the second user equipment needs to be changed from the Internet-based WebRTC audio communication to the telecommunications domain-based audio communication.

With reference to the first possible implementation manner of the first aspect, in a second possible implementation manner of the first aspect, before the determining, by the first user equipment, that the audio communication with the second user equipment needs to be changed from the Internet-based WebRTC audio communication to the telecommunications domain-based audio communication, the method further includes: receiving, by the first user equipment, first request information input by a user, where the first request message is used to indicate changing the audio communication between the first user equipment and the second user equipment from the Internet-based WebRTC audio communication to the telecommunications domain-based audio communication; or determining, by the first user equipment, that a quality value of the Internet-based communication with the second user equipment is beyond a predetermined range; or receiving, by the first user equipment, a second request message sent by a WebRTC server, where the second request message is used to indicate changing the audio communication between the first user equipment and the second user equipment from the Internet-based WebRTC audio communication to the telecommunications domain-based audio communication.

With reference to the first or second possible implementation manner of the first aspect, in a third possible implementation manner of the first aspect, the Internet-based WebRTC multimedia communication is performed between a WebRTC module of the first user equipment and a WebRTC module of the second user equipment, and the telecommunications domain-based audio communication is performed between a calling module of the first user equipment and a calling module of the second user equipment; before the establishing, by the first user equipment, telecommunications domain-based audio communication with the second user equipment, and disconnecting, by the first user equipment in a case in which the Internet-based WebRTC non-audio communication with the second user equipment remains, the Internet-based WebRTC audio communication with the second user equipment, the performing, by the first user equipment, a first audio communication change operation further includes: sending, by the WebRTC module of the first user equipment, a first audio communication change request to the WebRTC module of the second user equipment; receiving, by the WebRTC module of the first user equipment, a first audio communication change response that is sent by the WebRTC module of the second user equipment according to the first audio communication change request; and sending, by the WebRTC module of the first user equipment, a call request indication message to the calling module of the first user equipment based on the first audio communication change response; and the establishing, by the first user equipment, telecommunications domain-based audio communication with the second user equipment includes: sending, by the calling module of the first user equipment, a first call request to the calling module of the second user equipment based on the call request indication information, so that the calling module of the second user equipment starts a phone answering procedure based on the first call request.

With reference to the third possible implementation manner of the first aspect, in a fourth possible implementation manner of the first aspect, the first audio communication change request carries a telecommunications number of the first user equipment or carries a telecommunications number of the second user equipment; and the first audio communication change response carries the telecommunications number of the first user equipment and the telecommunications number of the second user equipment.

With reference to the third or fourth possible implementation manner of the first aspect, in a fifth possible implementation manner of the first aspect, the first call request carries a WebRTC identifier, and a WebRTC account of the first user equipment, so that a telecommunications server performs authentication on the first call request based on the WebRTC identifier and the WebRTC account of the first user equipment that are carried in the first call request.

With reference to any one of the third to fifth possible implementation manners of the first aspect, in a sixth possible implementation manner of the first aspect, after the sending, by the calling module of the first user equipment, a first call request to the calling module of the second user equipment, the performing, by the first user equipment, a first audio communication change operation further includes: receiving, by the WebRTC module of the first user equipment, a first call request confirmation message that is sent by the WebRTC module of the second user equipment before the calling module of the second user equipment starts the phone answering procedure, where the first call request confirmation message requests to confirm whether the first call request is a WebRTC-associated call request; and sending, by the WebRTC module of the first user equipment, a first call request confirmation response to the WebRTC module of the second user equipment according to the first call request confirmation message, so that the WebRTC module of the second user equipment instructs, according to the first call request confirmation response, the calling module of the second user equipment to start the phone answering procedure based on the first call request, where the first call request confirmation response is used to indicate that the first call request is a WebRTC-associated call request.

With reference to the first aspect, in a seventh possible implementation manner of the first aspect, the Internet-based WebRTC multimedia communication is performed between a WebRTC module of the first user equipment and a WebRTC module of the second user equipment, and the telecommunications domain-based audio communication is performed between a calling module of the first user equipment and a calling module of the second user equipment; before the establishing, by the first user equipment, telecommunications domain-based audio communication with the second user equipment, and disconnecting, by the first user equipment in a case in which the Internet-based WebRTC non-audio communication established with the second user equipment remains, the Internet-based WebRTC audio communication with the second user equipment, the performing, by the first user equipment, a first audio communication change operation further includes: receiving, by the WebRTC module of the first user equipment, a second audio communication change request sent by the WebRTC module of the second user equipment; sending, by the WebRTC module of the first user equipment, a second audio communication change response to the WebRTC module of the second user equipment based on the second audio communication change request; and receiving, by the calling module of the first user equipment, a second call request sent by the calling module of the second user equipment, where the second call request is a call request that, after receiving the second audio communication change response, the WebRTC module of the second user equipment instructs the calling module of the second user equipment to send; and the establishing, by the first user equipment, telecommunications domain-based audio communication with the second user equipment includes: starting, by the calling module of the first user equipment, a phone answering procedure according to the second call request.

With reference to the seventh possible implementation manner of the first aspect, in an eighth possible implementation manner of the first aspect, after the sending, by the WebRTC module of the first user equipment, a second audio communication change response to the WebRTC module of the second user equipment, the performing, by the first user equipment, a first audio communication change operation further includes: sending, by the WebRTC module of the first user equipment, a call request reporting request message to the calling module of the first user equipment, so as to request the calling module of the first user equipment to report to the WebRTC module of the first user equipment, when a call request of the second user equipment is received, the call request that is sent by the second user equipment; before the starting, by the calling module of the first user equipment, a phone answering procedure, the performing, by the first user equipment, a first audio communication change operation further includes: sending, by the calling module of the first user equipment, a call request reporting message to the WebRTC module of the first user equipment, where the call request reporting message is used to report the second call request to the WebRTC module of the first user equipment; sending, by the WebRTC module of the first user equipment, a second call request confirmation message to the WebRTC module of the second user equipment according to the call request reporting message, where the second call request confirmation message requests to confirm whether the second call request is a WebRTC-associated call request; receiving, by the WebRTC module of the first user equipment, a second call request confirmation response that is sent by the WebRTC module of the second user equipment according to the second call request confirmation message; and sending, by the WebRTC module of the first user equipment, a call request answering notification to the calling module of the first user equipment according to the second call request confirmation response, where the second call request response is used to confirm that the second call request is a WebRTC-associated call request; and the starting, by the calling module of the first user equipment, a phone answering procedure includes: starting, by the calling module of the first user equipment, the phone answering procedure based on the call request answering notification and the second call request.

With reference to the seventh or eighth possible implementation manner of the first aspect, in a ninth possible implementation manner of the first aspect, the second audio communication change request carries a telecommunications number of the first user equipment or carries a telecommunications number of the second user equipment, and the second audio communication change response message carries the telecommunications number of the first user equipment and the telecommunications number of the second user equipment.

With reference to any one of the seventh to ninth possible implementation manners of the first aspect, in a tenth possible implementation manner of the first aspect, the second call request carries a WebRTC identifier, and a WebRTC account of the second user equipment, so that a telecommunications server performs authentication on the first call request based on the WebRTC identifier and the WebRTC account of the second user equipment that are carried in the second call request.

With reference to any one of the third to tenth possible implementation manners of the first aspect, in an eleventh possible implementation manner of the first aspect, the disconnecting, by the first user equipment in a case in which the Internet-based WebRTC non-audio communication with the second user equipment remains, the Internet-based WebRTC audio communication with the second user equipment includes: sending, by the first user equipment, a first WebRTC connection modification request to the second user equipment, where the first WebRTC connection modification request requests to perform the Internet-based WebRTC non-audio communication but not the Internet-based WebRTC audio communication between the first user equipment and the second user equipment; receiving, by the first user equipment, a first WebRTC connection modification response that is sent by the second user equipment according to the first WebRTC connection modification request, where the first WebRTC connection modification response is used to confirm that the Internet-based WebRTC non-audio communication but not the Internet-based WebRTC audio communication is performed between the first user equipment and the second user equipment; and instructing, by the first user equipment, a user agent (UA) to stop collecting audio data of a microphone.

With reference to the eleventh possible implementation manner of the first aspect, in a twelfth possible implementation manner of the first aspect, a port number in a media line corresponding to audio of the Session Description Protocol (SDP) carried in the first WebRTC connection modification request is set to 0; and the instructing, by the first user equipment, a UA to stop collecting audio data of a microphone includes: instructing, by the first user equipment, the UA to set a status value of a media stream track of audio to muted.

With reference to any one of the third to tenth possible implementation manners of the first aspect, in a thirteenth possible implementation manner of the first aspect, the disconnecting, by the first user equipment in a case in which the Internet-based WebRTC non-audio communication with the second user equipment remains, the Internet-based WebRTC audio communication with the second user equipment includes: receiving, by the first user equipment, a second WebRTC connection modification request sent by the second user equipment, where the second WebRTC connection modification request requests to perform the Internet-based WebRTC non-audio communication but not the Internet-based WebRTC audio communication between the first user equipment and the second user equipment; sending, by the first user equipment, a second WebRTC connection modification response to the second user equipment based on the second WebRTC connection modification request, where the second WebRTC connection modification response is used to confirm that the Internet-based WebRTC non-audio communication but not the Internet-based WebRTC audio communication is performed between the first user equipment and the second user equipment; and instructing, by the WebRTC module of the first user equipment, a UA to stop collecting audio data of a microphone.

With reference to the thirteenth possible implementation manner of the first aspect, in a fourteenth possible implementation manner of the first aspect, a port number in a media line corresponding to audio of the SDP carried in the second WebRTC connection modification request is set to 0; and the instructing, by the first user equipment, a UA to stop collecting audio data of a microphone includes instructing, by the first user equipment, the UA to set a status value of a media stream track of audio to muted.

With reference to the first aspect, or any one of the first to fourteenth possible implementation manners of the first aspect, in a fifteenth possible implementation manner of the first aspect, after the performing, by the first user equipment, a first audio communication change operation, the method further includes: performing, by the first user equipment, a second audio communication change operation, where the performing, by the first user equipment, a second audio communication change operation includes: in a case in which the Internet-based WebRTC non-audio communication with the second user equipment remains, establishing, by the first user equipment, the Internet-based WebRTC audio communication with the second user equipment, and disconnecting, by the first user equipment, the telecommunications domain-based audio communication with the second user equipment.

With reference to the fifteenth possible implementation manner of the first aspect, in a sixteenth possible implementation manner of the first aspect, before the performing, by the first user equipment, a second audio communication change operation, the method further includes: determining, by the first user equipment, that the audio communication with the second user equipment needs to be changed from the telecommunications domain-based audio communication to the Internet-based WebRTC audio communication.

With reference to the sixteenth possible implementation manner of the first aspect, in a seventeenth possible implementation manner of the first aspect, before the determining, by the first user equipment, that the audio communication with the second user equipment needs to be changed from the telecommunications domain-based audio communication to the Internet-based WebRTC audio communication, the method further includes: receiving, by the first user equipment, third request information input by the user, where the third request message is used to indicate changing the audio communication between the first user equipment and the second user equipment from the telecommunications domain-based audio communication to the Internet-based WebRTC audio communication; or determining, by the first user equipment, that the quality value of the Internet-based communication with the second user equipment is within the predetermined range; or receiving, by the first user equipment, a fourth request message sent by the WebRTC server, where the fourth request message is used to indicate changing the audio communication between the first user equipment and the second user equipment from the telecommunications domain-based audio communication to the Internet-based WebRTC audio communication.

With reference to any one of the fifteenth to seventh possible implementation manners of the first aspect, in an eighteenth possible implementation manner of the first aspect, the establishing, by the first user equipment, the Internet-based WebRTC audio communication with the second user equipment in a case in which the Internet-based WebRTC non-audio communication with the second user equipment remains includes: sending, by the first user equipment, a third WebRTC connection modification request to the second user equipment, where the third WebRTC connection modification request requests to perform the Internet-based WebRTC non-audio communication and WebRTC audio communication between the first user equipment and the second user equipment; receiving, by the first user equipment, a third WebRTC connection modification response that is sent by the second user equipment based on the third WebRTC connection modification request, where the third WebRTC connection modification response is used to confirm that the Internet-based WebRTC non-audio communication and WebRTC audio communication are performed between the first user equipment and the second user equipment; and instructing, by the first user equipment, the UA to collect the audio data of the microphone.

With reference to the eighteenth possible implementation manner of the first aspect, in a nineteenth possible implementation manner of the first aspect, a port number in a media line corresponding to audio of the SDP carried in the third WebRTC connection modification request is set to a valid non-zero port number, which is used to indicate that the first user equipment can receive audio data; and the instructing, by the first user equipment, the UA to the collected audio data of the microphone includes instructing, by the first user equipment, the UA to set a status value of a media stream track of audio to live.

With reference to the fifteenth possible implementation manner of the first aspect, in a twentieth possible implementation manner of the first aspect, the establishing, by the first user equipment, the Internet-based WebRTC audio communication with the second user equipment in a case in which the Internet-based WebRTC non-audio communication with the second user equipment remains includes: receiving, by the first user equipment, a fourth WebRTC connection modification request sent by the second user equipment, where the fourth WebRTC connection modification request requests to perform the Internet-based WebRTC non-audio communication and WebRTC audio communication between the first user equipment and the second user equipment; sending, by the first user equipment, a fourth WebRT connection modification response to the second user equipment based on the fourth WebRTC connection modification request, where the fourth WebRTC connection modification response is used to confirm that the Internet-based WebRTC non-audio communication and WebRTC audio communication are performed between the first user equipment and the second user equipment; and instructing, by the first user equipment, the UA to collect the audio data of the microphone.

With reference to the twentieth possible implementation manner of the first aspect, in a twenty-first possible implementation manner of the first aspect, a port number in a media line corresponding to audio of the SDP carried in the fourth WebRTC connection modification request is set to a valid non-zero port number, which is used to indicate that the first user equipment can receive audio data; and the instructing, by the first user equipment, the UA to collect the audio data of the microphone includes: instructing, by the first user equipment, the UA to set a status value of a media stream track of audio to LIVE.

With reference to any one of the fifteenth to twenty-first possible implementation manners of the first aspect, in a twenty-second possible implementation manner of the first aspect, the disconnecting, by the first user equipment, the telecommunications domain-based audio communication with the second user equipment includes: sending, by the first user equipment, a first call hangup request to the second user equipment, so that the second user equipment starts a phone hangup procedure.

With reference to any one of the fifteenth to twenty-first possible implementation manners of the first aspect, in a twenty-third possible implementation manner of the first aspect, the disconnecting, by the first user equipment, the telecommunications domain-based audio communication with the second user equipment includes: receiving, by the first user equipment, a second call hangup request sent by the second user equipment; and starting, by the first user equipment, a call hangup procedure based on the second call hangup request.

According to a second aspect, a user equipment is provided, where the user equipment includes a WebRTC module and a calling module, where the WebRTC module of the user equipment is configured to establish Internet-based Web Real-Time Communication WebRTC multimedia communication with a WebRTC module of a second user equipment, where the Internet-based WebRTC multimedia communication includes Internet-based WebRTC audio communication and Internet-based WebRTC non-audio communication; and the user equipment is configured to perform a first audio communication change operation, where that the user equipment is configured to perform a first audio communication change operation includes: the calling module of the user equipment is configured to establish telecommunications domain-based audio communication with a calling module of the second user equipment, and the WebRTC module of the user equipment is further configured to disconnect, in a case in which the Internet-based WebRTC non-audio communication with the WebRTC module of the second user equipment remains, the Internet-based WebRTC audio communication with the WebRTC module of the second user equipment.

With reference to the second aspect, in a first possible implementation manner of the second aspect, the WebRTC module is further configured to determine, before the user equipment performs the first audio communication change operation, that the audio communication between the user equipment and the second user equipment needs to be changed from the Internet-based WebRTC audio communication to the telecommunications domain-based audio communication.

With reference to the first possible implementation manner of the second aspect, in a second possible implementation manner of the second aspect, the WebRTC module of the user equipment is further configured to: before determining that the audio communication between the user equipment and the second user equipment needs to be changed from the Internet-based WebRTC audio communication to the telecommunications domain-based audio communication, receive first request information input by a user, where the first request message is used to indicate changing the audio communication between the first user equipment and the second user equipment from the Internet-based WebRTC audio communication to the telecommunications domain-based audio communication; or determine that a quality value of the Internet-based communication with the second user equipment is beyond a predetermined range; or receive a second request message sent by a WebRTC server, where the second request message is used to indicate changing the audio communication between the first user equipment and the second user equipment from the Internet-based WebRTC audio communication to the telecommunications domain-based audio communication.

With reference to the first or second possible implementation manner of the second aspect, in a third possible implementation manner of the second aspect, the WebRTC module of the user equipment is further configured to: before the calling module of the user equipment establishes the telecommunications domain-based audio communication with the calling module of the second user equipment, and the WebRTC module of the user equipment is further configured to disconnect, in a case in which the Internet-based WebRTC non-audio communication with the WebRTC module of the second user equipment remains, the Internet-based WebRTC audio communication with the WebRTC module of the second user equipment, send a first audio communication change request to the WebRTC module of the second user equipment, receive a first audio communication change response that is sent by the WebRTC module of the second user equipment according to the first audio communication change request, and send a call request indication message to the calling module of the user equipment based on the first audio communication change response; and that the calling module of the user equipment is configured to establish telecommunications domain-based audio communication with a calling module of the second user equipment includes: the calling module of the user equipment is configured to receive the call request indication information, and send a first call request to the calling module of the second user equipment based on the call request indication information, so that the calling module of the second user equipment starts a phone answering procedure based on the first call request.

With reference to the third possible implementation manner of the second aspect, in a fourth possible implementation manner of the second aspect, the first audio communication change request carries a telecommunications number of the user equipment or carries a telecommunications number of the second user equipment; and the first audio communication change response carries the telecommunications number of the user equipment and the telecommunications number of the second user equipment.

With reference to the third or fourth possible implementation manner of the second aspect, in a fifth possible implementation manner of the second aspect, the first call request carries a WebRTC identifier, and a WebRTC account of the user equipment, so that a telecommunications server performs authentication on the first call request based on the WebRTC identifier and the WebRTC account of the user equipment that are carried in the first call request.

With reference to any one of the third to fifth possible implementation manners of the second aspect, in a sixth possible implementation manner of the second aspect, the WebRTC module of the user equipment is further configured to: after the calling module of the user equipment sends the first call request to the calling module of the second user equipment, receive a first call request confirmation message that is sent by the WebRTC module of the second user equipment before the calling module of the second user equipment starts the phone answering procedure, where the first call request confirmation message requests to confirm whether the first call request is a WebRTC-associated call request; and send a first call request confirmation response to the WebRTC module of the second user equipment, so that the WebRTC module of the second user equipment instructs, according to the first call request confirmation response, the calling module of the second user equipment to start the phone answering procedure based on the first call request, where the first call request confirmation response is used to indicate that the first call request is a WebRTC-associated call request.

With reference to the second aspect, in a seventh possible implementation manner of the second aspect, the WebRTC module of the user equipment is further configured to: before the calling module of the user equipment establishes the telecommunications domain-based audio communication with the calling module of the second user equipment, and the WebRTC module of the user equipment disconnects, in a case in which the Internet-based WebRTC non-audio communication with the WebRTC module of the second user equipment remains, the Internet-based WebRTC audio communication with the WebRTC module of the second user equipment, receive a second audio communication change request sent by the WebRTC module of the second user equipment, and send a second audio communication change response to the WebRTC module of the second user equipment based on the second audio communication change request; and that the calling module of the user equipment is configured to establish telecommunications domain-based audio communication with a calling module of the second user equipment includes: the calling module of the user equipment is configured to receive a second call request sent by the calling module of the second user equipment, where the second call request is a call request that, after receiving the second audio communication change response, the WebRTC module of the second user equipment instructs the calling module of the second user equipment to send; and start a phone answering procedure according to the second call request.

With reference to the seventh possible implementation manner of the second aspect, in an eighth possible implementation manner of the second aspect, the WebRTC module of the user equipment is further configured to: send a call request reporting request message to the calling module of the user equipment after the second audio communication change response is sent to the WebRTC module of the second user equipment request, so as to request the calling module of the user equipment to report to the WebRTC module of the user equipment, when a call request of the second user equipment is received, the call request that is sent by the second user equipment; the calling module of the user equipment is further configured to: before starting the phone answering procedure, send a call request reporting message to the WebRTC module of the user equipment, where the call request reporting message is used to report the second call request to the WebRTC module of the user equipment; the WebRTC module of the user equipment is further configured to: send a second call request confirmation message to the WebRTC module of the second user equipment according to the call request reporting message, where the second call request confirmation message requests to confirm whether the second call request is a WebRTC-associated call request; receive a second call request confirmation response that is sent by the WebRTC module of the second user equipment according to the second call request confirmation message; and send a call request answering notification to the calling module of the user equipment according to the second call request confirmation response, where the second call request response is used to confirm that the second call request is a WebRTC-associated call request; and that the calling module of the user equipment is configured to establish telecommunications domain-based audio communication with a calling module of the second user equipment includes: the calling module of the user equipment is configured to start the phone answering procedure based on the call request answering notification and the second call request.

With reference to the seventh or eighth possible implementation manner of the second aspect, in a ninth possible implementation manner of the second aspect, the second audio communication change request carries a telecommunications number of the user equipment or carries a telecommunications number of the second user equipment, and the second audio communication change response message carries the telecommunications number of the user equipment and the telecommunications number of the second user equipment.

With reference to any one of the seventh to ninth possible implementation manners of the second aspect, in a tenth possible implementation manner of the second aspect, the second call request carries a WebRTC identifier, and a WebRTC account of the second user equipment, so that a telecommunications server performs authentication on the first call request based on the WebRTC identifier and the WebRTC account of the second user equipment that are carried in the second call request.

With reference to any one of the third to tenth possible implementation manners of the second aspect, in an eleventh possible implementation manner of the second aspect, that the WebRTC module of the user equipment is configured to disconnect, in a case in which the Internet-based WebRTC non-audio communication with the WebRTC module of the second user equipment remains, the Internet-based WebRTC audio communication with the WebRTC module of the second user equipment includes: the WebRTC module of the user equipment is configured to: send a first WebRTC connection modification request to the WebRTC module of the second user equipment, receive a first WebRTC connection modification response that is sent by the WebRTC module of the second user equipment according to the first WebRTC connection modification request, and instruct a UA to stop collecting audio data of a microphone, where the first WebRTC connection modification request requests to perform the Internet-based WebRTC non-audio communication but not the Internet-based WebRTC audio communication between the user equipment and the second user equipment, and the first WebRTC connection modification response is used to confirm that the Internet-based WebRTC non-audio communication but not the Internet-based WebRTC audio communication, is performed between the user equipment and the second user equipment.

With reference to the eleventh possible implementation manner of the second aspect, in a twelfth possible implementation manner of the second aspect, a port number in a media line corresponding to audio of the SDP carried in the first WebRTC connection modification request is set to 0; and the WebRTC module of the user equipment is specifically configured to: instruct the UA to set a status value of a media stream track of audio to muted.

With reference to any one of the third to tenth possible implementation manners of the second aspect, in a thirteenth possible implementation manner of the second aspect, that the WebRTC module of the user equipment is configured to disconnect, in a case in which the Internet-based WebRTC non-audio communication with the WebRTC module of the second user equipment remains, the Internet-based WebRTC audio communication with the WebRTC module of the second user equipment includes: the WebRTC module of the user equipment receives a second WebRTC connection modification request sent by the WebRTC module of the second user equipment, sends a second WebRTC connection modification response to the WebRTC module of the second user equipment based on the WebRTC connection modification request, and instructs a UA to stop collecting audio data of a microphone, where the second WebRTC connection modification request requests to perform the Internet-based WebRTC non-audio communication but not the Internet-based WebRTC audio communication between the user equipment and the second user equipment, and the second WebRTC connection modification response is used to confirm that the Internet-based WebRTC non-audio communication but not the Internet-based WebRTC audio communication is performed between the user equipment and the second user equipment.

With reference to the thirteenth possible implementation manner of the second aspect, in a fourteenth possible implementation manner of the second aspect, a port number in a media line corresponding to audio of the SDP carried in the second WebRTC connection modification request is set to 0; and the WebRTC module of the user equipment is specifically configured to: instruct the UA to set a status value of a media stream track of audio to muted.

With reference to the second aspect, or any one of the first to fourteenth possible implementation manners of the second aspect, in a fifteenth possible implementation manner of the second aspect, after performing the first audio communication change operation, the user equipment is further configured to perform a second audio communication change operation, where that the user equipment is further configured to perform a second audio communication change operation includes: the WebRTC module of the user equipment is configured to establish, in a case in which the Internet-based WebRTC non-audio communication with the WebRTC module of the second user equipment remains, the Internet-based WebRTC audio communication with the WebRTC module of the second user equipment; and the calling module of the user equipment disconnects the telecommunications domain-based audio communication with the calling module of the second user equipment.

With reference to the fifteenth possible implementation manner of the second aspect, in a sixteenth possible implementation manner of the second aspect, before the user equipment performs the second audio communication change operation, the WebRTC module of the user equipment is further configured to: determine that the audio communication with the second user equipment needs to be changed from the telecommunications domain-based audio communication to the Internet-based WebRTC audio communication.

With reference to the sixteenth possible implementation manner of the second aspect, in a seventeenth possible implementation manner of the second aspect, before determining that the audio communication with the second user equipment needs to be changed from the telecommunications domain-based audio communication to the Internet-based WebRTC audio communication, the WebRTC module of the user equipment is further configured to: receive third request information input by the user, where the third request message is used to indicate changing the audio communication between the user equipment and the second user equipment from the telecommunications domain-based audio communication to the Internet-based WebRTC audio communication; or determine that the quality value of the Internet-based communication with the second user equipment is within the predetermined range; or receive a fourth request message sent by the WebRTC server, where the fourth request message is used to indicate changing the audio communication between the user equipment and the second user equipment from the telecommunications domain-based audio communication to the Internet-based WebRTC audio communication.

With reference to any one of the fifteenth to seventeenth possible implementation manners of the second aspect, in an eighteenth possible implementation manner of the second aspect, that the WebRTC module of the user equipment is configured to establish, in a case in which the Internet-based WebRTC non-audio communication with the WebRTC module of the second user equipment remains, the Internet-based WebRTC audio communication with the WebRTC module of the second user equipment includes: the WebRTC module of the user equipment sends a third WebRTC connection modification request to the WebRTC module of the second user equipment, receives a third WebRTC connection modification response that is sent by the WebRTC module of the second user equipment based on the third WebRTC connection modification request, and instructs the UA to collect the audio data of the microphone, where the third WebRTC connection modification request requests to perform the Internet-based WebRTC non-audio communication and WebRTC audio communication between the user equipment and the second user equipment, and the third WebRTC connection modification response is used to confirm that the Internet-based WebRTC non-audio communication and WebRTC audio communication are performed between the user equipment and the second user equipment.

With reference to the eighteenth possible implementation manner of the second aspect, in a nineteenth possible implementation manner of the second aspect, a port number in a media line corresponding to audio of the SDP carried in the third WebRTC connection modification request is set to a valid non-zero port number, which is used to indicate that the WebRTC module of the first user equipment can receive audio data; and the WebRTC module of the user equipment is specifically configured to: instruct the UA to set a status value of a media stream track of audio to live.

With reference to the fifteenth possible implementation manner of the second aspect, in a twentieth possible implementation manner of the second aspect, that the WebRTC module of the user equipment is configured to establish, in a case in which the Internet-based WebRTC non-audio communication with the second user equipment remains, the Internet-based WebRTC audio communication with the second user equipment includes: the WebRTC module of the user equipment is configured to receive a fourth WebRTC connection modification request sent by the second user equipment, send a fourth WebRT connection modification response to the second user equipment based on the fourth WebRTC connection modification request, and instruct the UA to collect the audio data of the microphone, where the fourth WebRTC connection modification request requests to perform the Internet-based WebRTC non-audio communication and WebRTC audio communication between the user equipment and the second user equipment, and the fourth WebRTC connection modification response is used to confirm that the Internet-based WebRTC non-audio communication and WebRTC audio communication are performed between the user equipment and the second user equipment.

With reference to the twentieth possible implementation manner of the second aspect, in a twenty-first possible implementation manner of the second aspect, a media line corresponding to audio of the SDP carried in the fourth WebRTC connection modification request is set to a valid non-zero port number, which is used to indicate that the WebRTC module of the first user equipment can receive audio data; and the WebRTC module of the user equipment is specifically configured to: instruct the UA to set a status value of a media stream track of audio to live.

With reference to any one of the fifteenth to twenty-first possible implementation manners of the second aspect, in a twenty-second possible implementation manner of the second aspect, that the calling module of the user equipment is configured to disconnect the telecommunications domain-based audio communication with the second user equipment includes: the calling module of the user equipment is configured to send a first call hangup request to the calling module of the second user equipment, so that the calling module of the second user equipment starts a phone hangup procedure.

With reference to any one of the fifteenth to twenty-first possible implementation manners of the second aspect, in a twenty-third possible implementation manner of the second aspect, that the calling module of the user equipment is configured to disconnect the telecommunications domain-based audio communication with the second user equipment includes: the calling module of the user equipment is configured to receive a second call hangup request sent by the second user equipment, and start a call hangup procedure based on the second call hangup request.

According to a third aspect, a user equipment is provided and includes a memory and a processor, where the memory is configured to store program code, and the processor is configured to call the program code stored in the memory to execute the following steps: establishing Internet-based Web Real-Time Communication WebRTC multimedia communication between the user equipment and a second user equipment, where the Internet-based WebRTC multimedia communication includes Internet-based WebRTC audio communication and Internet-based WebRTC non-audio communication; and performing a first audio communication change operation, where the performing a first audio communication change operation includes: establishing telecommunications domain-based audio communication between the user equipment and the second user equipment, and disconnecting, in a case in which the Internet-based WebRTC non-audio communication between the user equipment and the second user equipment remains, the Internet-based WebRTC audio communication between the user equipment and the second user equipment.

With reference to the third aspect, in a first possible implementation manner of the third aspect, before the performing a first audio communication change operation, the processor is further configured to call the program code stored in the memory to execute the following step: determining that the audio communication between the user equipment and the second user equipment needs to be changed from the Internet-based WebRTC audio communication to the telecommunications domain-based audio communication.

With reference to the first possible implementation manner of the third aspect, in a second possible implementation manner of the third aspect, before the determining that the audio communication between the user equipment and the second user equipment needs to be changed from the Internet-based WebRTC audio communication to the telecommunications domain-based audio communication, the processor is further configured to call the program code stored in the memory to execute the following step: receiving first request information input by a user, where the first request message is used to indicate changing the audio communication between the user equipment and the second user equipment from the Internet-based WebRTC audio communication to the telecommunications domain-based audio communication; or determining that a quality value of the Internet-based communication between the user equipment and the second user equipment is beyond a predetermined range; or receiving a second request message sent by a WebRTC server, where the second request message is used to indicate changing the audio communication between the user equipment and the second user equipment from the Internet-based WebRTC audio communication to the telecommunications domain-based audio communication.

With reference to the first or second possible implementation manner of the third aspect, in a third possible implementation manner of the third aspect, before the establishing telecommunications domain-based audio communication between the user equipment and the second user equipment, and disconnecting, in a case in which the Internet-based WebRTC non-audio communication between the user equipment and the second user equipment remains, the Internet-based WebRTC audio communication between the user equipment and the second user equipment, the performing a first audio communication change operation further includes: sending a first audio communication change request to the second user equipment; and receiving a first audio communication change response that is sent by the second user equipment according to the first audio communication change request; and the establishing telecommunications domain-based audio communication between the user equipment and the second user equipment includes: sending a first call request to the second user equipment based on the first audio communication change response, so that the second user equipment starts a phone answering procedure based on the first call request.

With reference to the third possible implementation manner of the third aspect, in a fourth possible implementation manner of the third aspect, the first audio communication change request carries a telecommunications number of the user equipment or carries a telecommunications number of the second user equipment; and the first audio communication change response carries the telecommunications number of the user equipment and the telecommunications number of the second user equipment.

With reference to the third or fourth possible implementation manner of the third aspect, in a fifth possible implementation manner of the third aspect, the first call request carries a WebRTC identifier, and a WebRTC account of the first user equipment, so that a telecommunications server performs authentication on the first call request based on the WebRTC identifier and the WebRTC account of the user equipment that are carried in the first call request.

With reference to any one of the third to fifth possible implementation manners of the third aspect, in a sixth possible implementation manner of the third aspect, after the sending a first call request to the second user equipment, the performing a first audio communication change operation further includes: receiving a first call request confirmation message that is sent by the second user equipment before the second user equipment starts the phone answering procedure, where the first call request confirmation message requests to confirm whether the first call request is a WebRTC-associated call request; and sending a first call request confirmation response to the second user equipment according to the first call request confirmation message, so that the second user equipment instructs, according to the first call request confirmation response, to start the phone answering procedure, where the first call request confirmation response is used to indicate that the first call request is a WebRTC-associated call request.

With reference to the third aspect, in a seventh possible implementation manner of the third aspect, before the establishing telecommunications domain-based audio communication between the user equipment and the second user equipment, and disconnecting, in a case in which the Internet-based WebRTC non-audio communication between the user equipment and the second user equipment remains, the Internet-based WebRTC audio communication between the user equipment and the second user equipment, the performing a first audio communication change operation further includes: receiving a second audio communication change request sent by the second user equipment; and sending a second audio communication change response to the second user equipment based on the second audio communication change request; and the establishing telecommunications domain-based audio communication between the user equipment and the second user equipment includes: receiving a second call request sent by the second user equipment, where the second call request is sent by the second user equipment after the second audio communication change response is received; and starting, by the user equipment, a phone answering procedure according to the second call request.

With reference to the seventh possible implementation manner of the third aspect, in an eighth seventh possible implementation manner of the third aspect, before the starting a phone answering procedure, the performing a first audio communication change operation further includes: sending a second call request confirmation message to the second user equipment, where the second call request confirmation message requests to confirm whether the second call request is a WebRTC-associated call request; and receiving a second call request confirmation response that is sent by the second user equipment according to the second call request confirmation message, where the second call request response is used to confirm that the second call request is a WebRTC-associated call request; and the starting a phone answering procedure includes: starting the phone answering procedure based on the second call request confirmation response and the second call request.

With reference to the seventh or eighth possible implementation manner of the third aspect, in a ninth possible implementation manner of the third aspect, the second audio communication change request carries a telecommunications number of the second user equipment or carries a telecommunications number of the second user equipment, and the second audio communication change response carries the telecommunications number of the user equipment and the telecommunications number of the second user equipment.

With reference to any one of the seventh to ninth possible implementation manners of the third aspect, in a tenth possible implementation manner of the third aspect, the second call request carries a WebRTC identifier, and a WebRTC account of the second user equipment, so that a telecommunications server performs authentication on the first call request based on the WebRTC identifier and the WebRTC account of the second user equipment that are carried in the second call request.

With reference to any one of the third to tenth possible implementation manners of the third aspect, in an eleventh possible implementation manner of the third aspect, the disconnecting, in a case in which the Internet-based WebRTC non-audio communication between the user equipment and the second user equipment remains, the Internet-based WebRTC audio communication between the user equipment and the second user equipment includes: sending a first WebRTC connection modification request to the second user equipment, where the first WebRTC connection modification request requests to perform the Internet-based WebRTC non-audio communication but not the Internet-based WebRTC audio communication between the user equipment and the second user equipment; receiving a first WebRTC connection modification response that is sent by the second user equipment according to the first WebRTC connection modification request, where the first WebRTC connection modification response is used to confirm that the Internet-based WebRTC non-audio communication but not the Internet-based WebRTC audio communication is performed between the user equipment and the second user equipment; and instructing a user agent UA to stop collecting audio data of a microphone.

With reference to the eleventh possible implementation manner of the third aspect, in a twelfth possible implementation manner of the third aspect, an m line corresponding to audio of an SDP file carried in the first WebRTC connection modification request is set to 0; and the instructing a UA to stop collecting audio data of a microphone includes: instructing the UA to set a status value of a MediaStreamTrack of audio to MUTED.

With reference to any one of the third to tenth possible implementation manners of the third aspect, in a thirteenth possible implementation manner of the third aspect, the disconnecting, in a case in which the Internet-based WebRTC non-audio communication between the user equipment and the second user equipment remains, the Internet-based WebRTC audio communication between the user equipment and the second user equipment includes: receiving a second WebRTC connection modification request sent by the second user equipment, where the second WebRTC connection modification request requests to perform the Internet-based WebRTC non-audio communication but not the Internet-based WebRTC audio communication between the user equipment and the second user equipment; sending a second WebRTC connection modification response to the second user equipment based on the WebRTC connection modification request, where the second WebRTC connection modification response is used to confirm that the Internet-based WebRTC non-audio communication but not the Internet-based WebRTC audio communication is performed between the user equipment and the second user equipment; and instructing a UA to stop collecting audio data of a microphone.

With reference to the thirteenth possible implementation manner of the third aspect, in a fourteenth possible implementation manner of the third aspect, an m line corresponding to audio of an SDP file carried in the second WebRTC connection modification request is set to 0; and the instructing a UA to stop collecting audio data of a microphone includes: instructing the UA to set a status value of a MediaStreamTrack of audio to MUTED.

With reference to the third aspect, or any one of the first to fourteenth possible implementation manners of the third aspect, in a fifteenth possible implementation manner of the third aspect, after the performing a first audio communication change operation, the processor is further configured to call the program code stored in the memory to execute the following step: performing a second audio communication change operation, where the performing a second audio communication change operation includes: in a case in which the Internet-based WebRTC non-audio communication between the user equipment and the second user equipment remains, establishing the Internet-based WebRTC audio communication between the user equipment and the second user equipment, and disconnecting the telecommunications domain-based audio communication between the user equipment and the second user equipment.

With reference to the fifteenth possible implementation manner of the third aspect, in a sixteenth possible implementation manner of the third aspect, before the performing a second audio communication change operation, the processor is further configured to call the program code stored in the memory to execute the following step: determining that the audio communication between the user equipment and the second user equipment needs to be changed from the telecommunications domain-based audio communication to the Internet-based WebRTC audio communication.

With reference to the sixteenth possible implementation manner of the third aspect, in a seventeenth possible implementation manner of the third aspect, before the determining that the audio communication between the user equipment and the second user equipment needs to be changed from the telecommunications domain-based audio communication to the Internet-based WebRTC audio communication, the processor is further configured to call the program code stored in the memory to execute the following step: receiving third request information input by the user, where the third request message is used to indicate changing the audio communication between the user equipment and the second user equipment from the telecommunications domain-based audio communication to the Internet-based WebRTC audio communication; or determining that the quality value of the Internet-based communication between the user equipment and the second user equipment is within the predetermined range; or receiving a fourth request message sent by the WebRTC server, where the fourth request message is used to indicate changing the audio communication between the user equipment and the second user equipment from the telecommunications domain-based audio communication to the Internet-based WebRTC audio communication.

With reference to any one of the fifteenth to seventeenth possible implementation manners of the third aspect, in an eighteenth possible implementation manner of the third aspect, the establishing the Internet-based WebRTC audio communication between the user equipment and the second user equipment in a case in which the Internet-based WebRTC non-audio communication between the user equipment and the second user equipment remains includes: sending a third WebRTC connection modification request to the second user equipment, where the third WebRTC connection modification request requests to perform the Internet-based WebRTC non-audio communication and WebRTC audio communication between the user equipment and the second user equipment; receiving a third WebRTC connection modification response that is sent by the second user equipment according to the third WebRTC connection modification request, where the third WebRTC connection modification response is used to confirm that the Internet-based WebRTC non-audio communication and WebRTC audio communication are performed between the user equipment and the second user equipment; and instructing the UA to collect the audio data of the microphone.

With reference to the eighteenth possible implementation manner of the third aspect, in a nineteenth possible implementation manner of the third aspect, a port number in a media line corresponding to audio of an SDP file carried in the third WebRTC connection modification request is set to a valid non-zero port number, which is used to indicate that the user equipment can receive audio data; and the instructing the UA to collect the audio data of the microphone includes: instructing the UA to set a status value of a media stream track of audio to LIVE.

With reference to the fifteenth possible implementation manner of the third aspect, in a twentieth possible implementation manner of the third aspect, the establishing the Internet-based WebRTC audio communication between the user equipment and the second user equipment in a case in which the Internet-based WebRTC non-audio communication between the user equipment and the second user equipment remains includes: receiving a fourth WebRTC connection modification request sent by the second user equipment, where the fourth WebRTC connection modification request requests to perform the Internet-based WebRTC non-audio communication and WebRTC audio communication between the user equipment and the second user equipment; sending a fourth WebRTC connection modification response to the second user equipment based on the fourth WebRTC connection modification request, where the fourth WebRTC connection modification response is used to confirm that the Internet-based WebRTC non-audio communication and WebRTC audio communication are performed between the user equipment and the second user equipment; and instructing the UA to collect the audio data of the microphone.

With reference to the twentieth possible implementation manner of the third aspect, in a twenty-first possible implementation manner of the third aspect, a port number in a media line corresponding to audio in the SDP carried in the fourth WebRTC connection modification request is set to a valid non-zero port number, which is used to indicate that the user equipment can receive audio data; and the instructing the UA to collect the audio data of the microphone includes: instructing the UA to set a status value of a media stream track of audio to LIVE.

With reference to any one of the fifteenth to twenty-first possible implementation manners of the third aspect, in a twenty-second possible implementation manner of the third aspect, the disconnecting the telecommunications domain-based audio communication between the user equipment and the second user equipment includes: sending a first call hangup request to the second user equipment, so that the second user equipment starts a phone hangup procedure.

With reference to any one of the fifteenth to twenty-first possible implementation manners of the third aspect, in a twenty-third possible implementation manner of the third aspect, the disconnecting the telecommunications domain-based audio communication between the user equipment and the second user equipment includes: receiving a second call hangup request sent by the second user equipment; and starting a call hangup procedure based on the second call hangup request.

Therefore, according to the embodiments of the present invention, when network conditions are not good, quality of audio communication between user equipments can be improved by changing the audio communication between the user equipments from Internet-based WebRTC audio communication to telecommunications domain-based audio communication. In addition, the Internet-based WebRTC audio communication is no longer performed between the user equipments, so that more bandwidth can be used for performing Internet-based WebRTC non-audio communication between the user equipments, and quality of the non-audio communication between the user equipments is also improved.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

FIG. 1 is a schematic flowchart of a communication method according to an embodiment of the present invention;

DESCRIPTION OF EMBODIMENTS

Figure 2:
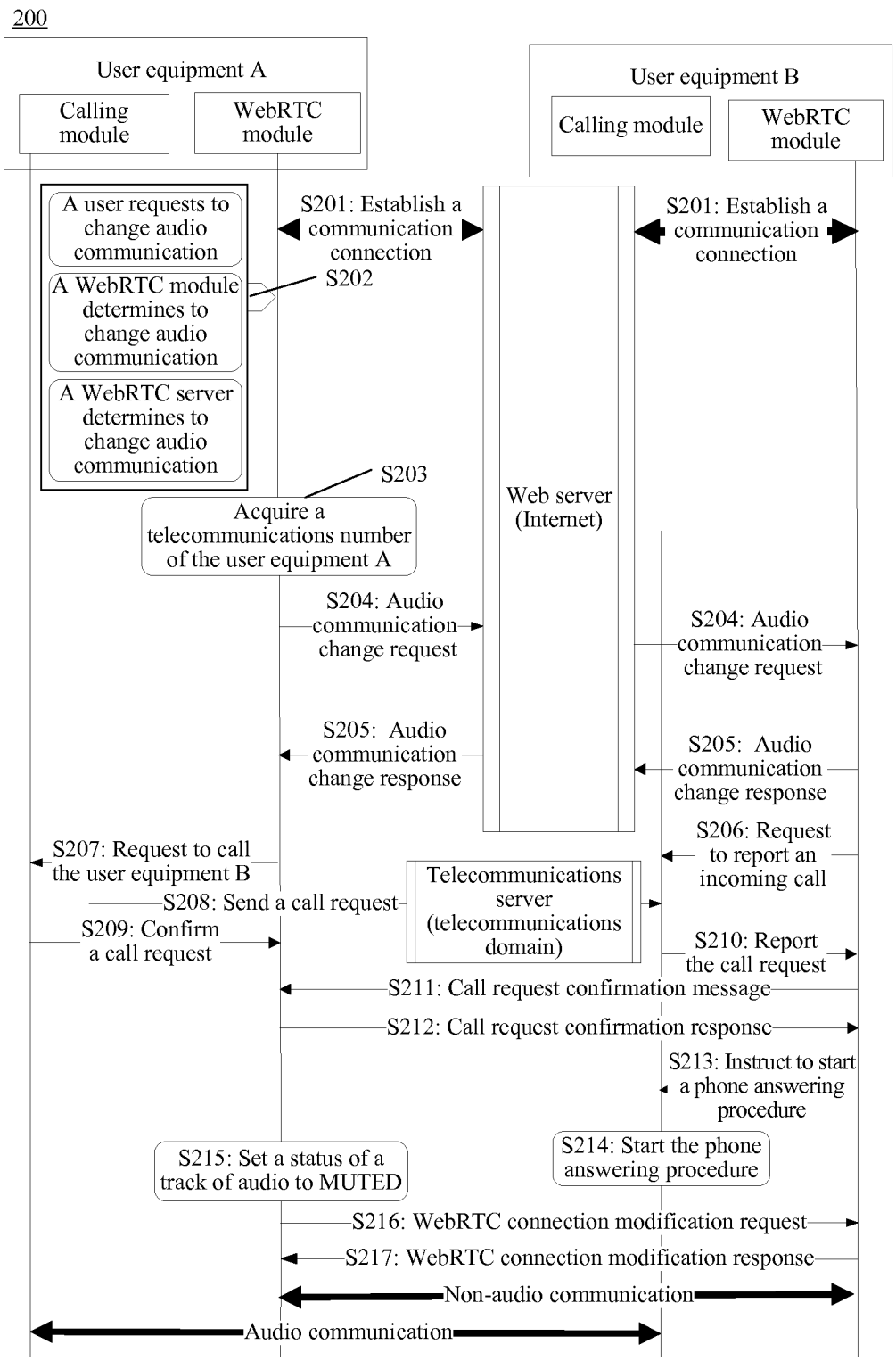
FIG. 2 is a schematic flowchart of a communication method according to another embodiment of the present invention.

The following clearly describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

FIG. 1 is a schematic flowchart of a communication method 100 according to an embodiment of the present invention. As shown in FIG. 1, the method 100 includes:

S110: A first user equipment establishes Internet-based WebRTC multimedia communication with a second user equipment, where the Internet-based WebRTC multimedia communication includes Internet-based WebRTC audio communication and Internet-based WebRTC non-audio communication. Optionally, the non-audio communication may include but is not limited to video communication, text and file transmission, and the like. The audio communication according to the embodiment of the present invention may also be referred to as voice communication.

S120: The first user equipment performs a first audio communication change operation. That the first user equipment performs a first audio communication change operation includes: the first user equipment establishes telecommunications domain-based audio communication with the second user equipment, and the first user equipment disconnects, in a case in which the Internet-based WebRTC non-audio communication with the second user equipment remains, the Internet-based WebRTC audio communication with the second user equipment. In the embodiment of the present invention, that the first user equipment disconnects the Internet-based WebRTC audio communication with the second user equipment means that the Internet-based WebRTC audio communication is not performed between the first user equipment and the second user equipment and is specifically that WebRTC audio data may be no longer transmitted based on the Internet between the first user equipment and the second user equipment.

In the embodiment of the present invention, after Internet-based WebRTC multimedia communication is established between a first user equipment and a second user equipment, the first user equipment may perform an audio communication change operation, so that audio communication established with the second user equipment can be changed from Internet-based WebRTC audio communication to telecommunications domain-based audio communication in a case in which Internet-based WebRTC non-audio communication established with the second user equipment remains. Specifically, the first user equipment may establish the telecommunications domain-based audio communication with the second user equipment, and in a case in which the Internet-based WebRTC non-audio communication with the second user equipment remains, disconnects the Internet-based WebRTC audio communication with the second user equipment, so as to implement a change in the audio communication. Therefore, when network conditions are not good, quality of the audio communication between the user equipments can be improved by changing the audio communication between the user equipments from the Internet-based WebRTC audio communication to the telecommunications domain-based audio communication. In addition, the Internet-based WebRTC audio communication is no longer performed between the user equipments, so that more bandwidth can be used for performing the Internet-based WebRTC non-audio communication between the user equipments, and quality of the non-audio communication between the user equipments is also improved.

In the embodiment of the present invention, in a case in which the Internet-based WebRTC non-audio communication established with the second user equipment remains, the first user equipment and the second user equipment may first disconnect the Internet-based WebRTC audio communication, and then establish the telecommunications domain-based audio communication, or may first establish the telecommunications domain-based audio communication, and then disconnect the Internet-based WebRTC audio communication, or simultaneously perform an operation of establishing the telecommunications domain-based audio communication and an operation of disconnecting the Internet-based WebRTC audio communication. For ease of description, that the telecommunications domain-based audio communication is first established and the Internet-based WebRTC audio communication is then disconnected and is used for detailed description in the following.

The following first introduces how to implement establishment of the telecommunications domain-based audio communication. As for how to establish the telecommunications domain-based audio communication, the following introduces two implementation manners.

In a first implementation manner, the first user equipment determines that the audio communication with the second user equipment needs to be changed from the Internet-based WebRTC audio communication to the telecommunications domain-based audio communication, where the first user equipment may determine that the audio communication with the second user equipment needs to be changed from the Internet-based WebRTC audio communication to the telecommunications domain-based audio communication after any one case of the following three cases occurs.

(1) The first user equipment receives first request information input by a user, where the first request message is used to indicate changing the audio communication between the first user equipment and the second user equipment from the Internet-based WebRTC audio communication to the telecommunications domain-based audio communication. Specifically, a user who uses the first user equipment may input the first request message when perceiving that call quality of the Internet-based WebRTC audio communication is relatively poor.

(2) The first user equipment determines that a quality value of the Internet-based communication with the second user equipment is beyond a predetermined range. Specifically, the quality value of communication may be at least one of the actually measured network bandwidth, packet loss, latency, jitter, and the like. If the quality value of communication is beyond the predetermined range, it indicates that quality of the Internet-based WebRTC communication between the first user equipment and the second user equipment is relatively poor.

(3) The first user equipment receives a second request message sent by a WebRTC server, where the second request message is used to indicate changing the audio communication between the first user equipment and the second user equipment from the Internet-based WebRTC audio communication to the telecommunications domain-based audio communication. Specifically, the WebRTC server may send the foregoing second request message when it is determined that bandwidth between the user equipments cannot ensure normal communication quality.

The Internet-based WebRTC multimedia communication may be performed between a WebRTC module of the first user equipment and a WebRTC module of the second user equipment, and the telecommunications domain-based audio communication may be performed between a calling module of the first user equipment and a calling module of the second user equipment.

In the embodiment of the present invention, the first user equipment may execute the telecommunications domain-based audio communication with the second user equipment after it is determined that the audio communication with the second user equipment needs to be changed from the Internet-based WebRTC audio communication to the telecommunications domain-based audio communication. A specific implementation manner may be: the WebRTC module of the first user equipment sends a first audio communication change request to the WebRTC module of the second user equipment; the WebRTC module of the first user equipment receives a first audio communication change response that is sent by the WebRTC module of the second user equipment according to the first audio communication change request; the WebRTC module of the first user equipment sends a call request indication message to the calling module of the first user equipment based on the first audio communication change response; and the calling module of the first user equipment sends a first call request to the calling module of the second user equipment based on the call request indication information, so that the calling module of the second user equipment starts a phone answering procedure based on the first call request.

Optionally, the first audio communication change request may carry a telecommunications number of the first user equipment or carries a telecommunications number of the second user equipment; and the first audio communication change response may carry the telecommunications number of the first user equipment and the telecommunications number of the second user equipment.

Optionally, the first call request may carry a WebRTC identifier, and a WebRTC account of the first user equipment, so that a telecommunications server performs authentication on the first call request based on the WebRTC identifier and the WebRTC account of the first user equipment.

Optionally, after the calling module of the first user equipment sends the first call request to the calling module of the second user equipment, the WebRTC module of the first user equipment further receives a first call request confirmation message that is sent by the WebRTC module of the second user equipment before the calling module of the second user equipment starts the phone answering procedure, where the first call request confirmation message requests to confirm whether the first call request is a WebRTC-associated call request; and the WebRTC module of the second user equipment sends a first call request confirmation response to the WebRTC module of the second user equipment according to the first call request confirmation message, so that the WebRTC module of the second user equipment instructs, according to the first call request confirmation response, the calling module of the second user equipment to start the phone answering procedure based on the first call request, where the first call request confirmation response is used to indicate that the first call request is a WebRTC-associated call request.

In a second implementation manner, establishment of the telecommunications domain-based audio communication between the first user equipment and the second user equipment may be: the WebRTC module of the first user equipment receives a second audio communication change request sent by a module of the second user equipment; the first user equipment sends a second audio communication change response to the WebRTC module of the second user equipment based on the second audio communication change request; the calling module of the first user equipment receives a second call request sent by the calling module of the second user equipment, where the second call request is a call request that, after receiving the second audio communication change response, the WebRTC module of the second user equipment instructs the calling module of the second user equipment to send; and the calling module of the first user equipment starts a phone answering procedure according to the second call request.

Optionally, after sending the second audio communication change response to the WebRTC module of the second user equipment, the WebRTC module of the first user equipment sends a call request reporting request message to the calling module of the first user equipment, so as to request the calling module of the first user equipment to report to the WebRTC module of the first user equipment, when a call request of the second user equipment is received, the call request that is sent by the second user equipment. Before starting the phone answering procedure, the calling module of the first user equipment can send a second call request reporting message to the WebRTC module of the first user equipment according to the call request reporting request message; the WebRTC module of the first user equipment sends a second call request confirmation message to the WebRTC module of the second user equipment according to the call request reporting message, where the second call request confirmation message requests to confirm whether the second call request is a WebRTC-associated call request; the WebRTC module of the first user equipment receives a second call request confirmation response that is sent by the WebRTC module of the second user equipment according to the second call request confirmation message; the WebRTC module of the first user equipment sends a call request answering notification to the calling module of the first user equipment according to the second call request confirmation response, where the second call request response is used to confirm that the second call request is a WebRTC-associated call request; and the calling module of the first user equipment may start a phone answering procedure based on the call request answering notification and the second call request.

Optionally, the second audio communication change request carries a telecommunications number of the second user equipment or carries a telecommunications number of the second user equipment, and the second audio communication change response message carries the telecommunications number of the first user equipment and the telecommunications number of the second user equipment.

Optionally, the second call request carries a WebRTC identifier, and a WebRTC account of the second user equipment, so that a telecommunications server performs authentication on the second call request based on the WebRTC identifier and the WebRTC account of the second user equipment.

In the embodiment of the present invention, after audio communication is established between the first user equipment and the second user equipment by using a telecommunications domain, the Internet-based WebRTC audio communication between the first user equipment and the second user equipment can be disconnected. As for how to disconnect the Internet-based WebRTC audio communication between the first user equipment and the second user equipment, the following describes two implementation manners.

In a first implementation manner, the first user equipment sends a first WebRTC connection modification request to the second user equipment, where the first WebRTC connection modification request requests to perform the Internet-based WebRTC non-audio communication but not the Internet-based WebRTC audio communication, between the WebRTC module of the first user equipment and the WebRTC module of the second user equipment. Specifically, a port number in a media line corresponding to audio of the SDP carried in the first WebRTC connection modification request is set to 0. The WebRTC module of the first user equipment receives a first WebRTC connection modification response that is sent by the WebRTC module of the second user equipment according to the first WebRTC connection modification request, where the first WebRTC connection modification response is used to confirm that the Internet-based non-audio communication but not the Internet-based WebRTC audio communication is performed between the WebRTC module of the first user equipment and the WebRTC module of the second user equipment. Optionally, the first user equipment may further instruct a user agent UA to stop collecting audio data of a microphone. Specifically, the first user equipment instructs the UA to set a status value of a media stream track of audio to muted.

Optionally, the user agent described in the embodiment of the present invention may be a browser.

In a second implementation manner, the first user equipment receives a second WebRTC connection modification request sent by the second user equipment, where the second WebRTC connection modification request requests to perform the Internet-based non-audio communication but not the Internet-based WebRTC audio communication between the first user equipment and the second user equipment. Specifically, a port number in a media line corresponding to audio of the SDP carried in the second WebRTC connection modification request is set to 0. The first user equipment sends a second WebRTC connection modification response to the WebRTC module of the second user equipment based on the WebRTC connection modification request, where the second WebRTC connection modification response is used to confirm that the Internet-based non-audio communication but not the Internet-based WebRTC audio communication is performed between the first user equipment and the second user equipment. Optionally, the first user equipment may further instruct a UA to stop collecting audio data of a microphone. Specifically, the first user equipment instructs the UA to set a status value of a media stream track of audio to muted.

In the embodiment of the present invention, after the audio communication of the first user equipment is changed from the Internet-based WebRTC audio communication to the telecommunications domain-based audio communication, the audio communication between the first user equipment and the second user equipment may be further changed to the Internet-based WebRTC audio communication in a case in which the Internet-based WebRTC non-audio communication established with the second user equipment remains. Similarly, in a case in which the Internet-based WebRTC non-audio communication established with the second user equipment remains, the first user equipment and the second user equipment may first disconnect the telecommunications domain-based audio communication, and then establish the Internet-based WebRTC audio communication, or may first establish the Internet-based WebRTC audio communication, and then disconnect the telecommunications domain-based audio communication, or simultaneously perform an operation of establishing the Internet-based WebRTC audio communication and an operation of disconnecting the telecommunications domain-based audio communication.

For ease of description, that the Internet-based WebRTC audio communication is first established and then the telecommunications domain-based audio communication is disconnected is used for detailed description in the following. As for how to establish the Internet-based WebRTC communication, the following provides two implementation manners.

In a first implementation manner, the first user equipment determines that the audio communication with the second user equipment needs to be changed from the telecommunications domain-based audio communication to the Internet-based WebRTC audio communication, where the first user equipment may determine that the telecommunications domain-based audio communication of the first user equipment needs to be changed to the Internet-based WebRTC audio communication after any one case of the following three cases occurs.

(1) The first user equipment receives third request information input by the user, where the third request message is used to indicate changing the audio communication between the first user equipment and the second user equipment from the telecommunications domain-based audio communication to the Internet-based WebRTC audio communication. Specifically, the user who uses the first user equipment may input the third request message when perceiving that network conditions are recovered.

(2) The first user equipment determines that the quality value of communication with the second user equipment is within the predetermined range. Specifically, the quality value of communication may be at least one of the actually measured network bandwidth, packet loss, latency, jitter, and the like. If the quality value of communication is within the predetermined range, it indicates that a network status between the first user equipment and the second user equipment is relatively good.

(3) The first user equipment receives a fourth request message sent by the WebRTC server, where the fourth request message is used to indicate changing the audio communication between the first user equipment and the second user equipment from the telecommunications domain-based audio communication to the Internet-based WebRTC audio communication. Specifically, the WebRTC server may send the foregoing fourth request message when it is determined that the bandwidth between the user equipments can ensure normal communication quality.

Specifically, establishment of the Internet-based WebRTC audio communication may be: the first user equipment sends a third WebRTC connection modification request to the second user equipment, where the third WebRTC connection modification request requests to perform the Internet-based WebRTC non-audio communication and WebRTC audio communication between the first user equipment and the second user equipment, and specifically, a port number in a media line corresponding to audio of the SDP carried in the third WebRTC connection modification request is set to a valid non-zero port number, which is used to indicate that the first user equipment can receive audio data; and the first user equipment receives a third WebRTC connection modification response that is sent by the second user equipment based on the third WebRTC connection modification request, where the third WebRTC connection modification response is used to confirm that the Internet-based WebRTC non-audio communication and WebRTC audio communication are performed between the first user equipment and the second user equipment. Optionally, if the UA has stopped collecting the audio data of the microphone before, the first user equipment needs to instruct the UA to collect the audio data of the microphone. Specifically, the first user equipment needs to instruct the UA to set a status value of a media stream track of audio to live.

In a second implementation manner, establishment of the Internet-based WebRTC audio communication may be: the first user equipment receives a fourth WebRTC connection modification request sent by the second user equipment, where the fourth WebRTC connection modification request requests to perform the Internet-based WebRTC non-audio communication and WebRTC audio communication between the first user equipment and the second user equipment, and specifically, a port number in a media line corresponding to audio of the SDP carried in the fourth WebRTC connection modification request is set to a valid non-zero port number, which is used to indicate that the first user equipment can receive audio data; and the first user equipment sends a fourth WebRTC connection modification response to the second user equipment based on the fourth WebRTC connection modification request, where the fourth WebRTC connection modification response is used to confirm that the Internet-based WebRTC non-audio communication and WebRTC audio communication are performed between the WebRTC module of the first user equipment and the WebRTC module of the second user equipment. Optionally, if the UA has stopped collecting the audio data of the microphone before, the first user equipment needs to instruct the UA to collect the audio data of the microphone. Specifically, the first user equipment instructs the UA to set a status value of a media stream track of audio to live.

As for how to disconnect the telecommunications domain-based audio communication established between the first user equipment and the second user equipment, the following also describes two implementation manners.

In a first implementation manner, the WebRTC module of the first user equipment sends a call hangup notification; and the calling module of the first user equipment sends a first call hangup request to the calling module of the second user equipment based on the call hangup notification, so that the calling module of the second user equipment starts a phone hangup procedure.

In a second implementation manner, the calling module of the first user equipment receives a second call hangup request sent by the calling module of the second user equipment; and the calling module of the first user equipment starts a call hangup procedure based on the second call hangup request.

Therefore, in the embodiment of the present invention, after Internet-based WebRTC multimedia communication is established between a first user equipment and a second user equipment, the first user equipment may perform an audio communication change operation, so that audio communication established with the second user equipment can be changed from Internet-based WebRTC audio communication to telecommunications domain-based audio communication in a case in which Internet-based WebRTC non-audio communication established with the second user equipment remains. Therefore, quality of the audio communication between the user equipments can be improved; in addition, the Internet-based WebRTC audio communication is no longer performed between the user equipments, so that more bandwidth can be used for performing the Internet-based WebRTC non-audio communication between the user equipments, and quality of the non-audio communication between the user equipments is also improved. In addition, further, the audio communication may be changed from the telecommunications domain-based audio communication to the Internet-based WebRTC audio communication in a case in which the Internet-based WebRTC non-audio communication established between the first user equipment and the second user equipment remains, and therefore, the Internet-based WebRTC audio communication can be used when network conditions are recovered, which has an advantage of a low charging rate or a free charging rate.

Figure 3:
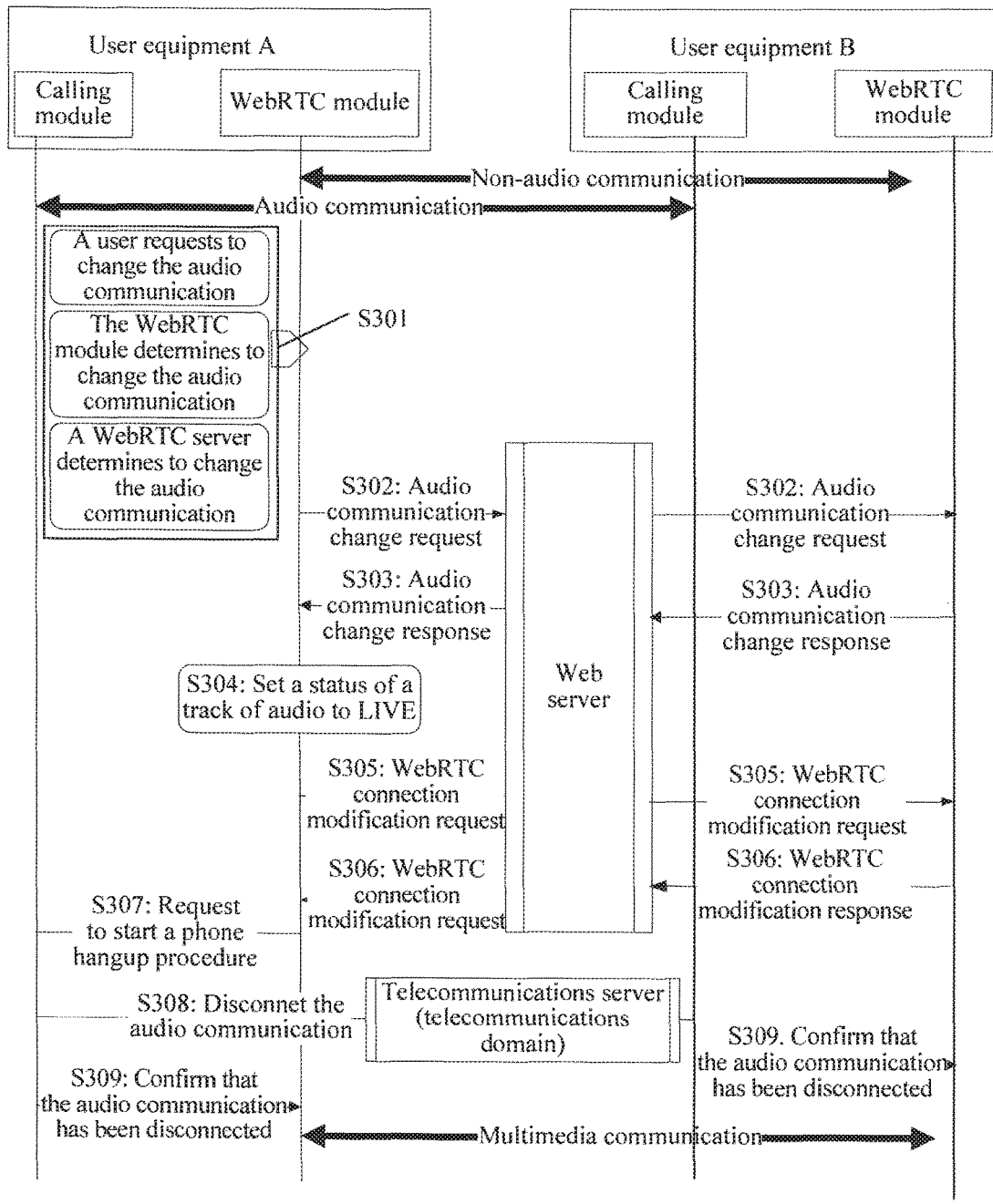
FIG. 3 is a schematic flowchart of a communication method according to another embodiment of the present invention.

To help understand the present invention more clearly, the following specifically describes the communication method according to the embodiments of the present invention with reference to FIG. 2 and FIG. 3. The foregoing first user equipment may have a function of a user equipment A and may also have a function of a user equipment B in the following.

FIG. 2 is a schematic flowchart of a communication method 200 according to an embodiment of the present invention. As shown in FIG. 2, the method 200 includes:

S201: A WebRTC module of the user equipment A and a WebRTC module of the user equipment B establish a communication connection, specifically, establish Internet-based WebRTC multimedia communication.

S202: The user equipment A determines that audio communication between the user equipment A and the user equipment B needs to be changed from Internet-based WebRTC audio communication to telecommunications domain-based audio communication, where, after the following three cases happen, the user equipment A may determine that the audio communication between the user equipment A and the user equipment B needs to be changed from the Internet-based WebRTC audio communication to the telecommunications domain-based audio communication after the following three cases occur.

(1) A user who possesses the user equipment A requests to change the audio communication from the Internet-based WebRTC audio communication to Internet-based audio communication.

(2) A quality value of communication that is obtained by measuring by the WebRTC module of the user equipment A is not within a predetermined range. Specifically, the quality value of communication may be at least one of the actually measured network bandwidth, packet loss, latency, jitter, and the like.

(3) A Web server requests to change the audio communication between the user equipment A and the user equipment B from the Internet-based WebRTC communication to the telecommunications domain-based audio communication.

S203: The WebRTC module of the user equipment A can check a contact list on the user equipment A to acquire a telecommunications number of the user equipment A that matches a WebRTC account of the user equipment A. WebRTC accounts aggregated in the contact list may be locally and automatically aggregated, may be locally and manually aggregated, may also be aggregated by a server, and the like.

S204: The WebRTC module of the user equipment A sends an audio communication change request to the WebRTC module of the user equipment B, where the audio communication change request requests to change the audio communication between the user equipment A and the user equipment B from the Internet-based WebRTC audio communication to the telecommunications domain-based audio communication, and the audio communication change request may carry the telecommunications number of the user equipment A. Optionally, if a telecommunications number of the user equipment B that matches a WebRTC account of the user equipment B is aggregated in the contact list on the user equipment A, the telecommunications number of the user equipment B may also be carried in the foregoing audio communication change request, where the audio communication change request may be forwarded to the WebRTC module of the user equipment B by the Web server.

S205: After receiving the audio communication change request sent by the WebRTC module of the user equipment A, the WebRTC module of the user equipment B may record the telecommunications number of the user equipment A that is carried in the audio communication change request. Optionally, if the audio communication change request carries the telecommunications number of the user equipment B, WebRTC of the user equipment B may verify whether the telecommunications number is correct; if the telecommunications number is incorrect, a correct telecommunications number of the user equipment B may be acquired. If the audio communication change request does not carry the telecommunications number of the user equipment B, the WebRTC module of the user equipment B may query the telecommunications number of the user equipment B that matches the WebRTC account of the user equipment B; the WebRTC module of the user equipment B sends an audio communication change response to the WebRTC module of the user equipment A, where the audio communication change response is used to confirm, with the WebRTC module of the user equipment A, that the audio communication between the user equipment A and the user equipment B can be changed from the Internet-based WebRTC audio communication to the telecommunications domain-based audio communication, and optionally, the audio communication change response carries the telecommunications number of the user equipment A and the telecommunications number of the user equipment B.

S206: The WebRTC module of the user equipment B sends a request to a calling module of the user equipment B, so as to request the calling module of the user equipment B to, if a call request sent by a calling module of the user equipment A is received, report the call request to the WebRTC module of the user equipment B.

S207: After receiving the audio communication change response sent by the WebRTC module of the user equipment B, the WebRTC module of the user equipment A may send a request message to the calling module of the user equipment A, so as to request the calling module of the user equipment A to send a call request to the calling module of the user equipment B, where the request message may carry the WebRTC account of the user equipment A or the telecommunications number of the user equipment A.

S208: After receiving the request message from the WebRTC module of the user equipment A, the calling module of the user equipment A sends a call request to the calling module of the user equipment B. The call request may be sent to the calling module of the user equipment B through a telecommunications server. Optionally, the call request may carry a WebRTC identifier, which is used to identify that the call request is used to implement changing the audio communication between the user equipment A and the user equipment B from the Internet-based WebRTC audio communication to the telecommunications domain-based audio communication. In addition to the telecommunications number of the user equipment A, the call request may further carry the WebRTC account of the user equipment A.

S209: The calling module of the user equipment A sends a confirmation message to the WebRTC module of the user equipment A, so as to confirm that the call request has been sent to the calling module of the user equipment B.

S210: After receiving the call request from the calling module of the user equipment A, the calling module of the user equipment B may report the call request to the WebRTC module of the user equipment B. A reporting message may carry the telecommunications number of the user equipment A or the WebRTC number of the user equipment A, so as to notify the WebRTC module of a user equipment from which a call comes.

S211. The WebRTC module of the user equipment B sends a call request confirmation message to the WebRTC module of the user equipment A, where the call request confirmation message is used to confirm whether the call request reported by the user equipment B is a WebRTC-associated request.

S212: After receiving the call request confirmation message sent by the WebRTC module of the user equipment B, the WebRTC module of the user equipment A confirms that the calling module of the user equipment A has been instructed to send the call request to the calling module of the user equipment B, and then, the WebRTC module of the user equipment A sends a call request confirmation response to the WebRTC module of the user equipment B, so as to confirm that the call request received by the calling module of the user equipment B is a WebRTC-associated call request.

S213: The WebRTC module of the user equipment B notifies the calling module of the user equipment B to start a phone answering procedure.

S214: After receiving a notification from the WebRTC module of the user equipment B, the calling module of the user equipment B starts the phone answering procedure. Specifically, the calling module of the user equipment B may automatically connect the audio communication with the user equipment A, and may also float an answer button on a screen for a user to manually connect the audio communication, and perform automatic hiding after the connection.

S215: After confirming that the telecommunications domain-based audio communication between the user equipment A and the user equipment B is connected, the WebRTC module of the user equipment A instructs a UA to set a status (namely readyState) value of a MediaStreamTrack object of audio to MUTED, so that the UA no longer collects audio data of a microphone.

S216: The WebRTC module of the user equipment A sends a WebRTC connection modification request to the WebRTC module of the user equipment B. Specifically, the WebRTC connection modification request may be an update Session offer message, and specific implementation may be that a port number in a media line corresponding to audio of the SDP in the update Session offer message is changed to 0.

S217: After receiving the WebRTC connection modification request sent by the WebRTC module of the user equipment A, the WebRTC module of the user equipment B sends a WebRTC connection modification response, which may specifically be an Update Session Answer message, to the WebRTC module of the user equipment A; and the WebRTC module of the user equipment B instructs the UA to set a status (namely readyState) value of a media stream track of audio to muted, so that the UA no longer collects the audio data of the microphone.

As can be seen from this figure, after the method 200 is executed, the WebRTC module of the user equipment A and the WebRTC module of the user equipment B may perform the Internet-based WebRTC non-audio communication, and the calling module of the user equipment A and the calling module of the user equipment B performs the telecommunications domain-based audio communication.

It should be understood that, the foregoing method 200 is merely a specific embodiment of the present invention, and the present invention further has other specific implementation manners. For example, the call request in step S208 may further carry the WebRTC identifier, and the WebRTC account of the user equipment A. In this way, when the telecommunications server receives the call request, the telecommunications server may establish a connection to the Web server, and the Web server determines, according to the WebRTC identifier, that the call request is a WebRTC-associated call request. Then, the telecommunications server may confirm, by using the WebRTC account of the user equipment A, whether the user equipment A has subscribed to a service of changing Internet-based audio communication between the user equipment A and another user equipment to telecommunications domain-based audio communication; if the user equipment A has subscribed to the service, the call request may be routed to the calling module of the user equipment B.

Therefore, in the embodiment of the present invention, in a case in which Internet-based WebRTC non-audio communication established between user equipments remains, audio communication established between the user equipments may be changed from Internet-based WebRTC audio communication to telecommunications domain-based audio communication. Therefore, quality of the audio communication between the user equipments can be improved when network quality is not good; in addition, the Internet-based WebRTC audio communication is no longer performed between the user equipments, so that more bandwidth can be used for performing the Internet-based WebRTC non-audio communication between the user equipments, and quality of the non-audio communication between the user equipments is also improved.

In an embodiment of the present invention, in a case in which Internet-based WebRTC non-audio communication remains, audio communication between user equipments is changed from Internet-based WebRTC audio communication to telecommunications domain-based audio communication, and in a case in which the Internet-based WebRTC non-audio communication remains, the audio communication between the user equipments may further be changed from the telecommunications domain-based audio communication to the Internet-based WebRTC audio communication, which may be specifically shown in FIG. 3.

FIG. 3 is a schematic flowchart of a communication method according to an embodiment of the present invention. As shown in FIG. 3, the method may include:

S301: A WebRTC module of a user equipment A determines that audio communication between the user equipment A and a user equipment B needs to be changed from telecommunications domain-based audio communication to Internet-based WebRTC audio communication. Specifically, the WebRTC module of the user equipment A may determine that the audio communication between the user equipment A and the user equipment B needs to be changed from the telecommunications domain-based audio communication to the Internet-based WebRTC audio communication when at least one of the following cases occurs.

(1) A user who possesses the user equipment A perceives that fluency of video images is very good and that there is no phenomenon, such as intermittent stop, and actively requests to change the audio communication from the telecommunications domain-based audio communication to the Internet-based WebRTC audio communication.

(2) A quality value of communication that is obtained by measuring by the WebRTC module of the user equipment A is not within a predetermined range. Specifically, the quality value of communication may be at least one of the actually measured network bandwidth, packet loss, latency, jitter, and the like.

(3) A Web server detects that communication bandwidth between the user equipment A and the user equipment B can ensure normal multimedia communication quality, and requests to change the audio communication between the user equipment A and the user equipment B from the telecommunications domain-based audio communication to the Internet-based WebRTC audio communication.

S302: After determining that the audio communication between the user equipment A and the user equipment B needs to be changed from the telecommunications domain-based audio communication to the Internet-based WebRTC audio communication, the WebRTC module of the user equipment A sends an audio communication change request to a WebRTC module of the user equipment B, so as to request to change the audio communication between the user equipment A and the user equipment B from the telecommunications domain-based audio communication to the Internet-based WebRTC audio communication, where the audio communication change request may be forwarded to the WebRTC module of the user equipment B by a web server, and the audio communication change request may carry WebRTC accounts of the user equipment A and the user equipment B.

S303: After the WebRTC module of the user equipment B receives the audio communication change request sent by the WebRTC module of the user equipment A, if the audio communication between the user equipment A and the user equipment B is allowed to change from the telecommunications domain-based audio communication to the Internet-based WebRTC audio communication, an audio communication change response may be sent to the WebRTC module of the user equipment A. The audio communication change response may carry the WebRTC accounts of the user equipment A and the user equipment B.

It should be understood that a telecommunications number of the user equipment A and a telecommunications number of the user equipment B may be further carried in the audio communication change request and the audio communication change response; when forwarding the audio communication change request and the audio communication change response, the Web server can query the telecommunications number of the user equipment A and the telecommunications number of the user equipment B that are respectively corresponding to the WebRTC account of the user equipment A and the WebRTC account of the user equipment B, and add the telecommunications number of the user equipment A and the telecommunications number of the user equipment B to the audio communication change request and the audio communication change response. Certainly, it may also be that the telecommunications numbers of the two parties are separately recorded by the WebRTC module of the user equipment A and the WebRTC module of the user equipment B respectively, and carried in the audio communication change request and the audio communication change response.

S304: After receiving the audio communication change response sent by the WebRTC module of the user equipment B, the WebRTC module of the user equipment A instructs a UA to set a track status (namely readystate) value of a MediaStreamTrack object of audio to LIVE, so that the UA starts collecting audio data of a microphone.

S305: The WebRTC module of the user equipment A sends a WebRTC connection modification request to the WebRTC module of the user equipment B. Specifically, the WebRTC connection modification request may be an update Session offer message, and specific implementation may be that an audio item is added to the SDP in the update Session offer message.

S306: After receiving the WebRTC connection modification request sent by the WebRTC module of the user equipment A, the WebRTC module of the user equipment B sends a WebRTC connection modification response, which may specifically be an Update Session Answer message, to the WebRTC module of the user equipment B; and the WebRTC module of the user equipment B instructs the UA to set a track status (namely readystate) value of a MediaStreamTrack of audio to LIVE, so that the UA starts collecting the audio data of the microphone.

S307: After receiving the WebRTC connection modification request sent by the WebRTC module of the user equipment B, the WebRTC module of the user equipment A can request a calling module of the user equipment A to start a phone procedure, which is used to disconnect the telecommunications domain-based audio communication between the user equipment A and the user equipment B.

S308: The calling module of the user equipment A starts the phone hangup procedure, so as to disconnect the telecommunications domain-based audio communication between the user equipment A and the user equipment B.

S309: After disconnecting the telecommunications domain-based audio communication between the user equipment A and the user equipment B, the calling module of the user equipment A sends a disconnection confirmation message to the WebRTC module of the user equipment A.

S309: After interrupting the telecommunications domain-based audio communication between the user equipment A and the user equipment B, the calling module of the user equipment B sends an interruption acknowledgement message to the WebRTC module of the user equipment B.

Therefore, in the embodiment of the present invention, in a case in which Internet-based WebRTC non-audio communication established between user equipments remains, audio communication established between the user equipments may be changed from Internet-based WebRTC audio communication to telecommunications domain-based audio communication. Therefore, quality of the audio communication between the user equipments can be improved when network conditions are not good; in addition, the Internet-based WebRTC audio communication is no longer performed between the user equipments, so that more bandwidth can be used for performing the Internet-based WebRTC non-audio communication between the user equipments, and quality of the non-audio communication between the user equipments is also improved. Further, the audio communication may be changed from the telecommunications domain-based audio communication to the Internet-based WebRTC audio communication in a case in which the Internet-based WebRTC non-audio communication established between the user equipments remains, and therefore, the Internet-based WebRTC audio communication can be used when the network conditions are recovered, which has an advantage of a low charging rate or a free charging rate.

Figure 4:
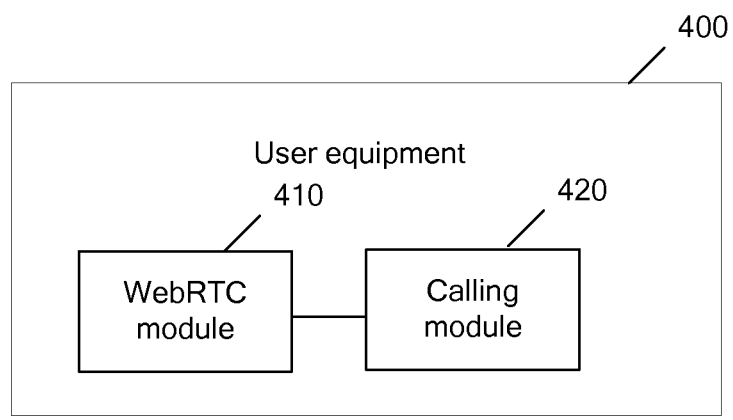
FIG. 4 is a schematic block diagram of a user equipment according to another embodiment of the present invention.

FIG. 4 is a schematic block diagram of a user equipment 400 according to an embodiment of the present invention. As shown in FIG. 4, the user equipment 400 includes a WebRTC module 410 and a calling module 420.

The WebRTC module 410 of the user equipment 400 is configured to establish Internet-based Web Real-Time Communication WebRTC multimedia communication with a WebRTC module of a second user equipment, where the Internet-based WebRTC multimedia communication includes Internet-based WebRTC audio communication and Internet-based WebRTC non-audio communication.

The user equipment 400 is configured to perform a first audio communication change operation, where that the user equipment 400 is configured to perform a first audio communication change operation includes: the calling module 420 of the user equipment 400 is configured to establish telecommunications domain-based audio communication with a calling module of the second user equipment, and the WebRTC module 410 of the user equipment 400 is further configured to disconnect, in a case in which the Internet-based WebRTC non-audio communication with the WebRTC module of the second user equipment remains, the Internet-based WebRTC audio communication with the WebRTC module of the second user equipment.

Optionally, the WebRTC module is further configured to determine, before the user equipment 400 performs the first audio communication change operation, that the audio communication between the user equipment 400 and the second user equipment needs to be changed from the Internet-based WebRTC audio communication to the telecommunications domain-based audio communication.

Optionally, the WebRTC module 410 of the user equipment 400 is further configured to: before the calling module 420 of the user equipment 400 establishes the telecommunications domain-based audio communication with the calling module of the second user equipment, and the WebRTC module 410 of the user equipment 400 disconnects the Internet-based WebRTC audio communication with the WebRTC module of the second user equipment in a case in which the Internet-based WebRTC non-audio communication with the WebRTC module of the second user equipment remains, receive first request information input by a user, where the first request message is used to indicate changing the audio communication between the first user equipment and the second user equipment from the Internet-based WebRTC audio communication to the telecommunications domain-based audio communication; or determine that a quality value of the Internet-based communication with the second user equipment is beyond a predetermined range; or receive a second request message sent by a WebRTC server, where the second request message is used to indicate changing the audio communication between the first user equipment and the second user equipment from the Internet-based WebRTC audio communication to the telecommunications domain-based audio communication.

Optionally, the WebRTC module 410 of the user equipment 400 is further configured to: before the calling module 420 of the user equipment 400 establishes the telecommunications domain-based audio communication with the calling module of the second user equipment, and the WebRTC module 410 of the user equipment 400 is further configured to disconnect the Internet-based WebRTC audio communication with the WebRTC module of the second user equipment in a case in which the Internet-based WebRTC non-audio communication with the WebRTC module of the second user equipment remains, send a first audio communication change request to the WebRTC module of the second user equipment, receive a first audio communication change response that is sent by the WebRTC module of the second user equipment according to the first audio communication change request, and send a call request indication message to the calling module 420 of the user equipment 400 based on the first audio communication change response.

That the calling module 420 of the user equipment 400 is configured to establish telecommunications domain-based audio communication with a calling module of the second user equipment includes: the calling module 420 of the user equipment 400 is configured to receive the call request indication information, and send a first call request to the calling module of the second user equipment based on the call request indication information, so that the calling module of the second user equipment starts a phone answering procedure based on the first call request.

Optionally, the first audio communication change request carries a telecommunications number of the user equipment 400 or carries a telecommunications number of the second user equipment, and the first audio communication change response carries the telecommunications number of the user equipment 400 and the telecommunications number of the second user equipment.

Optionally, the first call request carries a WebRTC identifier, and a WebRTC account of the user equipment 400, so that a telecommunications server performs authentication on the first call request based on the WebRTC identifier and the WebRTC account of the user equipment 400 that are carried in the first call request.

Optionally, the WebRTC module 410 of the user equipment 400 is further configured to: after the calling module 420 of the user equipment 400 sends the first call request to the calling module of the second user equipment, receive a first call request confirmation message that is sent by the WebRTC module of the second user equipment before the calling module of the second user equipment starts the phone answering procedure, where the first call request confirmation message requests to confirm whether the first call request is a WebRTC-associated call request; and send a first call request confirmation response to the WebRTC module of the second user equipment, so that the WebRTC module of the second user equipment instructs, according to the first call request confirmation response, the calling module of the second user equipment to start the phone answering procedure based on the first call request, where the first call request confirmation response is used to indicate that the first call request is a WebRTC-associated call request.

Optionally, the WebRTC module 410 of the user equipment 400 is further configured to: before the calling module 420 of the user equipment 400 establishes the telecommunications domain-based audio communication with the calling module of the second user equipment, and the WebRTC module 410 of the user equipment 400 disconnects, in a case in which the Internet-based WebRTC non-audio communication with the WebRTC module of the second user equipment remains, the Internet-based WebRTC audio communication with the WebRTC module of the second user equipment, receive a second audio communication change request sent by the WebRTC module of the second user equipment, and send a second audio communication change response to the WebRTC module of the second user equipment based on the second audio communication change request.

That the calling module 420 of the user equipment 400 is configured to establish telecommunications domain-based audio communication with a calling module of the second user equipment includes: the calling module 420 of the user equipment 400 is configured to receive a second call request sent by the calling module of the second user equipment, where the second call request is a call request that, after receiving the second audio communication change response, the WebRTC module of the second user equipment instructs the calling module of the second user equipment to send; and start a phone answering procedure according to the second call request.

Optionally, the WebRTC module 410 of the user equipment 400 is further configured to: send a call request reporting request message to the calling module 420 of the user equipment 400 after sending the second audio communication change response to the WebRTC module of the second user equipment, so as to request the calling module 420 of the user equipment 400 to report to the WebRTC module 410 of the user equipment 400, when a call request of the second user equipment is received, the call request that is sent by the second user equipment.

The calling module 420 of the user equipment 400 is further configured to: before starting the phone answering procedure, send a call request reporting message to the WebRTC module 410 of the user equipment 400, where the call request reporting message is used to report the second call request to the WebRTC module 410 of the user equipment 400.

The WebRTC module 410 of the user equipment 400 is further configured to: send a second call request confirmation message to the WebRTC module of the second user equipment according to the call request reporting message, where the second call request confirmation message requests to confirm whether the second call request is a WebRTC-associated call request; receive a second call request confirmation response that is sent by the WebRTC module of the second user equipment according to the second call request confirmation message; and send a call request answering notification to the calling module 420 of the user equipment 400 according to the second call request confirmation response, where the second call request response is used to confirm that the second call request is a WebRTC-associated call request.

That the calling module 420 of the user equipment 400 is configured to establish telecommunications domain-based audio communication with a calling module of the second user equipment includes: the calling module 420 of the user equipment 400 is configured to start the phone answering procedure based on the call request answering notification and the second call request.

Optionally, the second audio communication change request carries a telecommunications number of the user equipment 400 or carries a telecommunications number of the second user equipment, and the second audio communication change response message carries the telecommunications number of the user equipment 400 and the telecommunications number of the second user equipment.

Optionally, the second call request carries a WebRTC identifier, and a WebRTC account of the second user equipment, so that a telecommunications server performs authentication on the first call request based on the WebRTC identifier and the WebRTC account of the second user equipment that are carried in the second call request.

Optionally, that the WebRTC module 410 of the user equipment 400 is configured to disconnect, in a case in which the Internet-based WebRTC non-audio communication with the second user equipment remains, the Internet-based WebRTC audio communication with the second user equipment includes: the WebRTC module 410 of the user equipment 400 is configured to: send a first WebRTC connection modification request to the second user equipment, receive a first WebRTC connection modification response that is sent by the second user equipment according to the first WebRTC connection modification request, and instruct a user agent UA to stop collecting audio data of a microphone, where the first WebRTC connection modification request requests to perform the Internet-based WebRTC non-audio communication but not the Internet-based WebRTC audio communication between the user equipment 400 and the second user equipment, and the first WebRTC connection modification response is used to confirm that the Internet-based WebRTC non-audio communication but not the Internet-based WebRTC audio communication is performed between the user equipment 400 and the second user equipment.

Optionally, a port in a media (m) line corresponding to audio of the SDP carried in the first WebRTC connection modification request is set to 0.

The WebRTC module 410 of the user equipment 400 is specifically configured to: instruct the UA to set a status value of a MediaStreamTrack of audio to MUTED.

Optionally, that the WebRTC module 410 of the user equipment 400 is configured to disconnect, in a case in which the Internet-based WebRTC non-audio communication with the second user equipment remains, the Internet-based WebRTC audio communication with the second user equipment includes: the WebRTC module 410 of the user equipment 400 receives a second WebRTC connection modification request sent by the second user equipment, sends a second WebRTC connection modification response to the second user equipment based on the WebRTC connection modification request, and instructs a UA to stop collecting audio data of a microphone, where the second WebRTC connection modification request requests to perform the Internet-based WebRTC non-audio communication but not the Internet-based WebRTC audio communication between the user equipment 400 and the second user equipment, and the second WebRTC connection modification response is used to confirm that the Internet-based WebRTC non-audio communication but not the Internet-based WebRTC audio communication is performed between the user equipment 400 and the second user equipment.

Optionally, a port number in a media (m) line corresponding to audio of the SDP carried in the second WebRTC connection modification request is set to 0.

The WebRTC module 410 of the user equipment 400 is specifically configured to: instruct the UA to set a status value of a MediaStreamTrack of audio to MUTED.

Optionally, after performing the first audio communication change operation, the user equipment 400 is further configured to perform a second audio communication change operation, where that the user equipment 400 is further configured to perform a second audio communication change operation includes: the WebRTC module 410 of the user equipment 400 is further configured to establish, in a case in which the Internet-based WebRTC non-audio communication with the second user equipment remains, the Internet-based WebRTC audio communication with the WebRTC module of the second user equipment; and the calling module 420 of the user equipment 400 disconnects the telecommunications domain-based audio communication with the second user equipment.

Optionally, before the user equipment 400 performs the second audio communication change operation, the WebRTC module 410 of the user equipment 400 is further configured to: determine that the audio communication with the second user equipment needs to be changed from the telecommunications domain-based audio communication to the Internet-based WebRTC audio communication.

Optionally, before determining that the audio communication with the second user equipment needs to be changed from the telecommunications domain-based audio communication to the Internet-based WebRTC audio communication, the WebRTC module 410 of the user equipment 400 is further configured to: receive third request information input by the user, where the third request message is used to indicate changing the audio communication between the user equipment 400 and the second user equipment from the telecommunications domain-based audio communication to the Internet-based WebRTC audio communication; or determine that the quality value of the Internet-based communication with the second user equipment is within the predetermined range; or receive a fourth request message sent by the WebRTC server, where the fourth request message is used to indicate changing the audio communication between the user equipment 400 and the second user equipment from the telecommunications domain-based audio communication to the Internet-based WebRTC audio communication.

Optionally, that the WebRTC module 410 of the user equipment 400 is configured to establish, in a case in which the Internet-based WebRTC non-audio communication with the second user equipment remains, the Internet-based WebRTC audio communication with the second user equipment includes: the WebRTC module 410 of the user equipment 400 sends a third WebRTC connection modification request to the second user equipment, receives a third WebRTC connection modification response that is sent by the second user equipment based on the third WebRTC connection modification request, and instructs the UA to collect the audio data of the microphone, where the third WebRTC connection modification request requests to perform the Internet-based WebRTC non-audio communication and WebRTC audio communication between the user equipment 400 and the second user equipment, and the third WebRTC connection modification response is used to confirm that the Internet-based WebRTC non-audio communication and WebRTC audio communication are performed between the user equipment 400 and the second user equipment.

Optionally, a port number in a m line corresponding to audio of the SDP carried in the third WebRTC connection modification request is set to a valid non-zero port number, which is used to indicate that the WebRTC module of the first user equipment can receive audio data.

The WebRTC module 410 of the user equipment 400 is specifically configured to: instruct the UA to set a status value of a MediaStreamTrack of audio to LIVE.

Optionally, that the WebRTC module 410 of the user equipment 400 is configured to establish, in a case in which the Internet-based WebRTC non-audio communication with the second user equipment remains, the Internet-based WebRTC audio communication with the second user equipment includes: the WebRTC module 410 of the user equipment 400 is configured to: receive a fourth WebRTC connection modification request sent by the second user equipment, send a fourth WebRT connection modification response to the second user equipment based on the fourth WebRTC connection modification request, and instruct the UA to collect the audio data of the microphone, where the fourth WebRTC connection modification request requests to perform the Internet-based WebRTC non-audio communication and WebRTC audio communication between the user equipment 400 and the second user equipment, and the fourth WebRTC connection modification response is used to confirm that the Internet-based WebRTC non-audio communication and WebRTC audio communication are performed between the user equipment 400 and the second user equipment.

Optionally, a port number in a media (m) line corresponding to audio of the SDP carried in the fourth WebRTC connection modification request is set to a valid non-zero port number, which is used to indicate that the WebRTC module of the first user equipment can receive audio data.

The WebRTC module 410 of the user equipment 400 is specifically configured to: instruct the UA to set a status value of a MediaStreamTrack of audio to LIVE.

Optionally, that the calling module 420 of the user equipment 400 is configured to disconnect the telecommunications domain-based audio communication with the second user equipment includes: the calling module 420 of the user equipment 400 is configured to send a first call hangup request to the calling module of the second user equipment, so that the calling module of the second user equipment starts a phone hangup procedure.

Optionally, that the calling module 420 of the user equipment 400 is configured to disconnect the telecommunications domain-based audio communication with the second user equipment includes: the calling module 420 of the user equipment 400 is configured to receive a second call hangup request sent by the second user equipment, and starts a call hangup procedure based on the second call hangup request.

In the embodiment of the present invention, the user equipment 400 may be corresponding to the first user equipment in the foregoing method embodiment, and may have a function possessed by the first user equipment. For brevity, details are not described herein again.

Therefore, in the embodiment of the present invention, in a case in which Internet-based WebRTC non-audio communication established between user equipments remains, audio communication established between the user equipments may be changed from Internet-based WebRTC audio communication to telecommunications domain-based audio communication. Therefore, quality of the audio communication between user equipments can be improved when network conditions are not good; in addition, the Internet-based WebRTC audio communication is no longer performed between the user equipments, so that more bandwidth can be used for performing the Internet-based WebRTC non-audio communication between the user equipments, and quality of the non-audio communication between the user equipments is also improved. In addition, further, the audio communication may be changed from the telecommunications domain-based audio communication to the Internet-based WebRTC audio communication in a case in which the Internet-based WebRTC non-audio communication established between the user equipments remains, and therefore, the Internet-based WebRTC audio communication can be used when the network conditions are recovered, which has an advantage of a low charging rate or a free charging rate.

Figure 5:
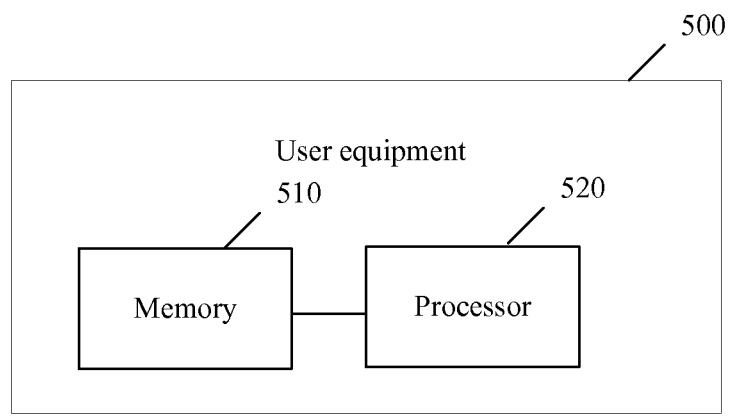
FIG. 5 is a schematic block diagram of a user equipment according to another embodiment of the present invention.

FIG. 5 is a schematic block diagram of a user equipment 500 according to an embodiment of the present invention. As shown in FIG. 5, the user equipment 500 includes a memory 510 and a processor 520, where the memory 510 is configured to store program code, and the processor 520 is configured to call the program code stored in the memory 510 to execute the following steps: establishing Internet-based WebRTC multimedia communication between the user equipment 500 and a second user equipment, where the Internet-based WebRTC multimedia communication includes Internet-based WebRTC audio communication and Internet-based WebRTC non-audio communication; and performing a first audio communication change operation, where the performing a first audio communication change operation includes: establishing telecommunications domain-based audio communication between the user equipment 500 and the second user equipment, and disconnecting, in a case in which the Internet-based WebRTC non-audio communication between the user equipment 500 and the second user equipment remains, the Internet-based WebRTC audio communication between the user equipment 500 and the second user equipment.

Optionally, before the performing a first audio communication change operation, the processor 520 is further configured to call the program code stored in the memory 510 to execute the following step: determining that the audio communication between the user equipment 500 and the second user equipment needs to be changed from the Internet-based WebRTC audio communication to the telecommunications domain-based audio communication.

Optionally, before the determining that the audio communication between the user equipment 500 and the second user equipment needs to be changed from the Internet-based WebRTC audio communication to the telecommunications domain-based audio communication, the processor 520 is further configured to call the program code stored in the memory 510 to execute the following step: receiving first request information input by a user, where the first request message is used to indicate changing the audio communication between the user equipment 500 and the second user equipment from the Internet-based WebRTC audio communication to the telecommunications domain-based audio communication; or determining that a quality value of the Internet-based communication between the user equipment 500 and the second user equipment is beyond a predetermined range; or receiving a second request message sent by a WebRTC server, where the second request message is used to indicate changing the audio communication between the user equipment 500 and the second user equipment from the Internet-based WebRTC audio communication to the telecommunications domain-based audio communication.

Optionally, before the establishing telecommunications domain-based audio communication between the user equipment 500 and the second user equipment, and disconnecting, in a case in which the Internet-based WebRTC non-audio communication between the user equipment 500 and the second user equipment remains, the Internet-based WebRTC audio communication between the user equipment 500 and the second user equipment, the performing a first audio communication change operation further includes: sending a first audio communication change request to the second user equipment; and receiving a first audio communication change response that is sent by the second user equipment according to the first audio communication change request.

The establishing telecommunications domain-based audio communication between the user equipment 500 and the second user equipment includes: sending a first call request to the second user equipment based on the first audio communication change response, so that the second user equipment starts a phone answering procedure based on the first call request.

Optionally, the first audio communication change request carries a telecommunications number of the user equipment 500 or carries a telecommunications number of the second user equipment, and the first audio communication change response carries the telecommunications number of the user equipment 500 and the telecommunications number of the second user equipment.

Optionally, the first call request carries a WebRTC identifier, and a WebRTC account of the user equipment 500, so that a telecommunications server performs authentication on the first call request based on the WebRTC identifier and the WebRTC account of the user equipment 500 that are carried in the first call request.

Optionally, after the sending a first call request to the second user equipment, the performing a first audio communication change operation further includes: receiving a first call request confirmation message that is sent by the second user equipment before the second user equipment starts the phone answering procedure, where the first call request confirmation message requests to confirm whether the first call request is a WebRTC-associated call request; and sending a first call request confirmation response to the second user equipment according to the first call request confirmation message, so that the second user equipment instructs, according to the first call request confirmation response, to start the phone answering procedure, where the first call request confirmation response is used to indicate that the first call request is a WebRTC-associated call request.

Optionally, before the establishing telecommunications domain-based audio communication between the user equipment 500 and the second user equipment, and disconnecting, in a case in which the Internet-based WebRTC non-audio communication between the user equipment 500 and the second user equipment remains, the Internet-based WebRTC audio communication between the user equipment 500 and the second user equipment, the performing a first audio communication change operation further includes: receiving a second audio communication change request sent by the second user equipment; and sending a second audio communication change response to the second user equipment based on the second audio communication change request.

The establishing telecommunications domain-based audio communication between the user equipment 500 and the second user equipment includes: receiving a second call request sent by the second user equipment, where the second call request is sent by the second user equipment after the second audio communication change response is received; and starting a phone answering procedure according to the second call request.

Optionally, before the starting a phone answering procedure, the performing a first audio communication change operation further includes: sending a second call request confirmation message to the second user equipment, where the second call request confirmation message requests to confirm whether the second call request is a WebRTC-associated call request; and receiving a second call request confirmation response that is sent by a WebRTC module of the second user equipment according to the second call request confirmation message, where the second call request response is used to confirm that the second call request is a WebRTC-associated call request; and the starting a phone answering procedure includes: starting the phone answering procedure based on the second call request confirmation response and the second call request.

Optionally, the second audio communication change request carries a telecommunications number of the second user equipment or carries a telecommunications number of the second user equipment, and the second audio communication change response message carries the telecommunications number of the user equipment 500 and the telecommunications number of the second user equipment.

Optionally, the second call request carries a WebRTC identifier, and a WebRTC account of the second user equipment, so that a telecommunications server performs authentication on the first call request based on the WebRTC identifier and the WebRTC account of the second user equipment that are carried in the second call request.

Optionally, the disconnecting, in a case in which the Internet-based WebRTC non-audio communication between the user equipment 500 and the second user equipment remains, the Internet-based WebRTC audio communication between the user equipment 500 and the second user equipment includes: sending a first WebRTC connection modification request to the second user equipment, where the first WebRTC connection modification request requests to perform the Internet-based non-audio communication but not the Internet-based WebRTC audio communication between the user equipment 500 and the second user equipment; receiving a first WebRTC connection modification response that is sent by the second user equipment according to the first WebRTC connection modification request, where the first WebRTC connection modification response is used to confirm that the Internet-based non-audio communication but not the Internet-based WebRTC audio communication is performed between the user equipment 500 and the second user equipment; and instructing a user agent UA to stop collecting audio data of a microphone.

Optionally, a port number in a m line corresponding to audio of the SDP carried in the first WebRTC connection modification request is set to 0.

The instructing a user agent UA to stop collecting audio data of a microphone includes: instructing the UA to set a status value of a MediaStreamTrack of audio to MUTED.

Optionally, the disconnecting, in a case in which the Internet-based WebRTC non-audio communication between the user equipment 500 and the second user equipment remains, the Internet-based WebRTC audio communication between the user equipment 500 and the second user equipment includes: receiving a second WebRTC connection modification request sent by the second user equipment, where the second WebRTC connection modification request requests to perform the Internet-based non-audio communication but not the Internet-based WebRTC audio communication between the user equipment 500 and the second user equipment; sending a second WebRTC connection modification response to the second user equipment based on the WebRTC connection modification request, where the second WebRTC connection modification response is used to confirm that the Internet-based non-audio communication but not the Internet-based WebRTC audio communication is performed between the user equipment 500 and the second user equipment; and instructing a UA to stop collecting audio data of a microphone.

Optionally, a port number in a m line corresponding to audio of the SDP carried in the second WebRTC connection modification request is set to 0.

The instructing a user agent UA to stop collecting audio data of a microphone includes: instructing the UA to set a status value of a MediaStreamTrack of audio to MUTED.

Optionally, after the performing a first audio communication change operation, the processor 520 is further configured to call the program code stored in the memory 510 to execute the following step: performing a second audio communication change operation, where the performing a second audio communication change operation includes: in a case in which the Internet-based WebRTC non-audio communication between the user equipment 500 and the second user equipment remains, establishing the Internet-based WebRTC audio communication between the user equipment 500 and the second user equipment, and disconnecting the telecommunications domain-based audio communication between the user equipment 500 and the second user equipment.

Optionally, before the performing a second audio communication change operation, the processor 520 is further configured to call the program code stored in the memory 510 to execute the following step: determining that the audio communication between the user equipment 500 and the second user equipment needs to be changed from the telecommunications domain-based audio communication to the Internet-based WebRTC audio communication.

Optionally, before the determining that the audio communication between the user equipment 500 and the second user equipment needs to be changed from the telecommunications domain-based audio communication to the Internet-based WebRTC audio communication, the processor 520 is further configured to call the program code stored in the memory 510 to execute the following step: receiving third request information input by the user, where the third request message is used to indicate changing the audio communication between the user equipment 500 and the second user equipment from the telecommunications domain-based audio communication to the Internet-based WebRTC audio communication; or determining that the quality value of the Internet-based communication between the user equipment 500 and the second user equipment is within the predetermined range; or receiving a fourth request message sent by the WebRTC server, where the fourth request message is used to indicate changing the audio communication between the user equipment 500 and the second user equipment from the telecommunications domain-based audio communication to the Internet-based WebRTC audio communication.

Optionally, the establishing the Internet-based WebRTC audio communication between the user equipment 500 and the second user equipment in a case in which the Internet-based WebRTC non-audio communication between the user equipment 500 and the second user equipment remains includes: sending a third WebRTC connection modification request to the second user equipment, where the third WebRTC connection modification request requests to perform the Internet-based WebRTC non-audio communication and WebRTC audio communication between the user equipment 500 and the second user equipment; receiving a third WebRTC connection modification response that is sent by the second user equipment based on the third WebRTC connection modification request, where the third WebRTC connection modification response is used to confirm that the Internet-based WebRTC non-audio communication and WebRTC audio communication are performed between the user equipment 500 and the second user equipment; and instructing the UA to collect the audio data of the microphone.

Optionally, a port number in a m line corresponding to audio of the SDP carried in the third WebRTC connection modification request is set to a valid non-zero port number, which is used to indicate that the user equipment 500 can receive audio data.

The instructing the user agent UA to collect the audio data of the microphone includes: instructing the UA to set a status value of a MediaStreamTrack of audio to LIVE.

Optionally, the establishing the Internet-based WebRTC audio communication between the user equipment 500 and the second user equipment in a case in which the Internet-based WebRTC non-audio communication between the user equipment 500 and the second user equipment remains includes: receiving a fourth WebRTC connection modification request sent by the second user equipment, where the fourth WebRTC connection modification request requests to perform the Internet-based WebRTC non-audio communication and WebRTC audio communication between the user equipment 500 and the second user equipment; sending a fourth WebRT connection modification response to the second user equipment based on the fourth WebRTC connection modification request, where the fourth WebRTC connection modification response is used to confirm that the Internet-based WebRTC non-audio communication and WebRTC audio communication are performed between the user equipment 500 and the second user equipment; and instructing the UA to collect the audio data of the microphone.

Optionally, a port number in a m line corresponding to audio of the SDP carried in the fourth WebRTC connection modification request is set to a valid non-zero port number, which is used to indicate that the user equipment 500 can receive audio data.

The instructing the user agent UA to collect the audio data of the microphone includes: instructing the UA to set a status value of a MediaStreamTrack of audio to LIVE.

Optionally, the disconnecting the telecommunications domain-based audio communication between the user equipment 500 and the second user equipment includes: sending a first call hangup request to the second user equipment, so that the second user equipment starts a phone hangup procedure.

Optionally, the disconnecting the telecommunications domain-based audio communication between the user equipment 500 and the second user equipment includes: receiving a second call hangup request sent by the second user equipment; and starting a call hangup procedure based on the second call hangup request.

In the embodiment of the present invention, the user equipment 500 may be corresponding to the first user equipment in the foregoing method embodiment, and may have a function possessed by the first user equipment. For brevity, details are not described herein again.

Therefore, in the embodiment of the present invention, in a case in which Internet-based WebRTC non-audio communication established between user equipments remains, audio communication established between the user equipments may be changed from Internet-based WebRTC audio communication to telecommunications domain-based audio communication. Therefore, quality of the audio communication between user equipments can be improved when network conditions are not good; in addition, the Internet-based WebRTC audio communication is no longer performed between the user equipments, so that more bandwidth can be used for performing the Internet-based WebRTC non-audio communication between the user equipments, and the quality of non-audio communication between the user equipments is also improved. In addition, further, the audio communication may be changed from the telecommunications domain-based audio communication to the Internet-based WebRTC audio communication in a case in which the Internet-based WebRTC non-audio communication established between the user equipments remains, and therefore, the Internet-based WebRTC audio communication can be used when the network conditions are recovered, which has an advantage of a low charging rate or a free charging rate.

What is claimed is:

1. A communication method, comprising:
    establishing, by a first user equipment, Internet-based Web Real-Time Communication (WebRTC) multimedia communication with a second user equipment, wherein the Internet-based WebRTC multimedia communication comprises Internet-based WebRTC audio communication and Internet-based WebRTC non-audio communication; and
    performing, by the first user equipment, a first audio communication change operation by:
        establishing, by the first user equipment, telecommunications domain-based audio communication with the second user equipment; and
        disconnecting, by the first user equipment when the Internet-based WebRTC non-audio communication with the second user equipment remains, the Internet-based WebRTC audio communication with the second user equipment.

2. The method according to claim 1, wherein before performing, by the first user equipment, the first audio communication change operation, the method further comprises determining, by the first user equipment, that audio communication with the second user equipment needs to be changed from the Internet-based WebRTC audio communication to the telecommunications domain-based audio communication, wherein the first audio communication change operation comprises changing audio communications from the Internet-bases WebRTC audio communication to the telecommunications domain-based audio communication, and wherein the telecommunications domain-based audio communication are not Internet-based.

3. The method according to claim 2, wherein before determining, by the first user equipment, that the audio communication with the second user equipment needs to be changed from the Internet-based WebRTC audio communication to the telecommunications domain-based audio communication, the method further comprises determining, by the first user equipment, that a quality value of the Internet-based WebRTC audio communication with the second user equipment is beyond a predetermined range.

4. The method according to claim 2, wherein the Internet-based WebRTC multimedia communication is performed between the first user equipment and the second user equipment, and wherein the telecommunications domain-based audio communication is performed between the first user equipment and the second user equipment, wherein before establishing, by the first user equipment, the telecommunications domain-based audio communication with the second user equipment, and disconnecting, by the first user equipment, the Internet-based WebRTC audio communication with the second user equipment when the Internet-based WebRTC non-audio communication with the second user equipment remains, performing, by the first user equipment, the first audio communication change operation further comprises:
    sending, by the first user equipment, a first audio communication change request to the second user equipment;

receiving, by the first user equipment, a first audio communication change response from the second user equipment according to the first audio communication change request; and sending, by the first user equipment, a call request indication message to the first user equipment based on the first audio communication change response, and wherein establishing, by the first user equipment, the telecommunications domain-based audio communication with the second user equipment comprises sending, by the first user equipment, a first call request to the second user equipment based on a call request indication information.

5. The method according to of claim 4, wherein after sending, by the first user equipment, the first call request to the second user equipment, performing, by the first user equipment, the first audio communication change operation further comprises:

receiving, by the first user equipment, a first call request confirmation message from the second user equipment, wherein the first call request confirmation message is used to confirm whether the first call request is a WebRTC-associated call request; and sending, by the first user equipment, a first call request confirmation response to the second user equipment according to the first call request confirmation message, and wherein the first call request confirmation response is used to indicate that the first call request is the WebRTC-associated call request.

6. The method according to claim 1, wherein after performing, by the first user equipment, the first audio communication change operation, the method further comprises performing, by the first user equipment, a second audio communication change operation, wherein the performing, by the first user equipment, the second audio communication change operation comprises:

establishing, by the first user equipment, the Internet-based WebRTC audio communication with the second user equipment when the Internet-based WebRTC non-audio communication with the second user equipment remains; and disconnecting, by the first user equipment, the telecommunications domain-based audio communication with the second user equipment when the Internet-based WebRTC non-audio communication with the second user equipment remains.

7. The method according to claim 6, wherein before performing, by the first user equipment, the second audio communication change operation, the method further comprises determining, by the first user equipment, that the audio communication with the second user equipment needs to be changed from the telecommunications domain-based audio communication to the Internet-based WebRTC audio communication.

8. The method according to claim 7, wherein before determining, by the first user equipment, that the audio communication with the second user equipment needs to be changed from the telecommunications domain-based audio communication to the Internet-based WebRTC audio communication, the method further comprises determining, by the first user equipment, that a quality value of the Internet-based WebRTC audio communication with the second user equipment is within a predetermined range.

9. The method according to claim 6, wherein establishing, by the first user equipment, the Internet-based WebRTC audio communication with the second user equipment when the Internet-based WebRTC non-audio communication with the second user equipment remains comprises:

sending, by the first user equipment, a third WebRTC connection modification request to the second user equipment, wherein the third WebRTC connection modification request is used to request the Internet-based WebRTC non-audio communication and WebRTC audio communication between the first user equipment and the second user equipment;

receiving, by the first user equipment, a third WebRTC connection modification response from the second user equipment based on the third WebRTC connection modification request, wherein the third WebRTC connection modification response is used to confirm that the Internet-based WebRTC non-audio communication and WebRTC audio communication are performed between the first user equipment and the second user equipment; and instructing, by the first user equipment, a user agent (UA) to collect audio data of a microphone.

10. The method according to claim 6, wherein establishing, by the first user equipment, the Internet-based WebRTC audio communication with the second user equipment when the Internet-based WebRTC non-audio communication with the second user equipment remains comprises:

receiving, by the first user equipment, a fourth WebRTC connection modification request from the second user equipment, wherein the fourth WebRTC connection modification request is used to request the Internet-based WebRTC non-audio communication and WebRTC audio communication between the first user equipment and the second user equipment;

sending, by the first user equipment, a fourth WebRTC connection modification response to the second user equipment based on the fourth WebRTC connection modification request, wherein the fourth WebRTC connection modification response is used to confirm that the Internet-based WebRTC non-audio communication and WebRTC audio communication are performed between the first user equipment and the second user equipment; and instructing, by the first user equipment, a user agent (UA) to collect audio data of a microphone.

11. A user equipment, wherein the user equipment comprises:

a memory; and a processor, wherein the memory is configured to store program code, and wherein the processor is configured to call the program code stored in the memory to execute the following steps:

establish Internet-based Web Real-Time Communication (WebRTC) multimedia communication between the user equipment and a second user equipment, wherein the Internet-based WebRTC multimedia communication comprises Internet-based WebRTC audio communication and Internet-based WebRTC non-audio communication;

perform a first audio communication change operation by establishing telecommunications domain-based audio communication between the user equipment and the second user equipment; and disconnect the Internet-based WebRTC audio communication between the user equipment and the second user equipment when the Internet-based WebRTC non-audio communication between the user equipment and the second user equipment remains.

12. The user equipment according to claim 11, wherein the is further configured to call the program code stored in the memory to determine, before the user equipment performs the first audio communication change operation, that audio communication between the user equipment and the second user equipment needs to be changed from the Internet-based WebRTC audio communication to the telecommunications domain-based audio communication, wherein the first audio communication change operation comprises changing audio communications from the Internet-based WebRTC audio communication to the telecommunications domain-based audio communication, and wherein the telecommunications domain-based audio communication are not Internet-based.

13. The user equipment according to claim 12, wherein the processor is further configured to call the program code stored in the memory to:
receive a first request message before determining that the audio communication between the user equipment and the second user equipment needs to be changed from the Internet-based WebRTC audio communication to the telecommunications domain-based audio communication, wherein the first request message is used to indicate changing the audio communication between the user equipment and the second user equipment from the Internet-based WebRTC audio communication to the telecommunications domain-based audio communication; or
determine that a quality value of the Internet-based WebRTC audio communication with the second user equipment is beyond a predetermined range; or
receive a second request message from a WebRTC server, wherein the second request message is used to indicate changing the audio communication between the user equipment and the second user equipment from the Internet-based WebRTC audio communication to the telecommunications domain-based audio communication.

14. The user equipment according to claim 12, wherein the processor is further configured to call the program code stored in the memory to:
send a first audio communication change request to the second user equipment before the user equipment establishes the telecommunications domain-based audio communication with the second user equipment and the user equipment disconnects the Internet-based WebRTC audio communication with the second user equipment when the Internet-based WebRTC non-audio communication with the second user equipment remains;
receive a first audio communication change response that is from the second user equipment according to the first audio communication change request; and
send a first call request the second user equipment based on the first audio communication change response.

15. The user equipment according to claim 14, wherein the processor is further configured to call the program code stored in the memory to:
receive a first call request confirmation message from the second user equipment after the user equipment sends the first call request to the second user equipment, wherein the first call request confirmation message is used to request to confirm whether the first call request is a WebRTC-associated call request; and send a first call request confirmation response to the second user equipment, wherein the first call request confirmation response is used to indicate that the first call request is a WebRTC-associated call request.

16. The user equipment according to claim 11, wherein after performing the first audio communication change operation, the processor is further configured to call the perform code stored in the memory to:
establish the Internet-based WebRTC audio communication with the second user equipment when the Internet-based WebRTC non-audio communication with the second user equipment remains; and
disconnect the telecommunications domain-based audio communication with the second user equipment.

17. The user equipment according to claim 16, wherein before the user equipment performs a second audio communication change operation, the processor is further configured to call the program code stored in the memory to determine that the audio communication with the second user equipment needs to be changed from the telecommunications domain-based audio communication to the Internet-based WebRTC audio communication.

18. The user equipment according to claim 17, wherein before determining that the audio communication with the second user equipment needs to be changed from the telecommunications domain-based audio communication to the Internet-based WebRTC audio communication, the processor is further configured to call the program code stored in the memory to:
receive third request information input by the user, wherein a third request message is used to indicate changing the audio communication between the user equipment and the second user equipment from the telecommunications domain-based audio communication to the Internet-based WebRTC audio communication; or
determine that a quality value of the Internet-based WebRTC audio communication with the second user equipment is within a predetermined range; or
receive a fourth request message from a WebRTC server, wherein the fourth request message is used to indicate changing the audio communication between the user equipment and the second user equipment from the telecommunications domain-based audio communication to the Internet-based WebRTC audio communication.

19. The user equipment according to claim 16, wherein the processor being configured to call the program code stored in the memory to establish the Internet-based WebRTC audio communication with the second user equipment comprises the processor being configured to call the program code stored in the memory to:
send a third WebRTC connection modification request to the second user equipment;
receive a third WebRTC connection modification response that is from the second user equipment based on the third WebRTC connection modification request; and
instruct a user agent (UA) to collect audio data of a microphone, wherein the third WebRTC connection modification request is used to request the Internet-based WebRTC non-audio communication and WebRTC audio communication between the user equipment and the second user equipment, and wherein the third WebRTC connection modification response is used to confirm that the Internet-based WebRTC non-audio communication and WebRTC audio communication are performed between the user equipment and the second user equipment.

20. The user equipment according to claim 16, wherein the processor being configured to establish the Internet-based WebRTC audio communication with the second user equipment comprises the processor being configured to call the program code stored in the memory to:
- receive a fourth WebRTC connection modification request from the second user equipment;
- send a fourth WebRTC connection modification response to the second user equipment based on the fourth WebRTC connection modification request; and
- instruct a user agent (UA) to collect audio data of a microphone, wherein the fourth WebRTC connection modification request is used to request the Internet-based WebRTC non-audio communication and WebRTC audio communication between the user equipment and the second user equipment, and wherein the fourth WebRTC connection modification response is used to confirm that the Internet-based WebRTC non-audio communication and WebRTC audio communication are performed between the user equipment and the second user equipment.

\* \* \* \* \*

UNITED STATES PATENT AND TRADEMARK OFFICE
CERTIFICATE OF CORRECTION

PATENT NO.         : 9,871,929 B2                         Page 1 of 1
APPLICATION NO.    : 14/553511
DATED              : January 16, 2018
INVENTOR(S)        : Xiaoqiang Lv et al.

It is certified that error appears in the above-identified patent and that said Letters Patent is hereby corrected as shown below:

Column 45; Line 14; Claim 5 should read:
The method according to claim 4, wherein after Column 45; Line 35; Claim 6 should read:
communication change operation, wherein performing Column 47; Line 4; Claim 12 should read:
the processor is further configured to call the program code stored in Column 48; Line 8; Claim 16 should read:
program code stored in the memory to:

Signed and Sealed this
Thirteenth Day of March, 2018

Andrei Iancu
*Director of the United States Patent and Trademark Office*